(12) United States Patent
Switzer et al.

(10) Patent No.: US 12,043,171 B1
(45) Date of Patent: Jul. 23, 2024

(54) INVISIBLE LIGHTED FEATURE THROUGH A COMPOSITE PANEL

(71) Applicant: The Boeing Company, Arlington, VA (US)

(72) Inventors: Lon Eric Switzer, Seattle, WA (US); Carolina Aranda, Seattle, WA (US); Eric Eagon, Seattle, WA (US); Gregory William Nelson, Everett, WA (US); Frank H. Fash, Lynnwood, WA (US)

(73) Assignee: THE BOEING COMPANY, Arlington, VA (US)

( * ) Notice: Subject to any disclaimer, the term of this patent is extended or adjusted under 35 U.S.C. 154(b) by 0 days.

(21) Appl. No.: 18/316,465

(22) Filed: May 12, 2023

(51) Int. Cl.
| | |
|---|---|
| *B60Q 3/60* | (2017.01) |
| *B60Q 3/43* | (2017.01) |
| *B64D 11/00* | (2006.01) |
| *F21V 3/02* | (2006.01) |
| *F21V 3/04* | (2018.01) |
| *F21W 106/00* | (2018.01) |
| *F21W 107/30* | (2018.01) |
| *F21Y 115/10* | (2016.01) |

(52) U.S. Cl.
CPC ............ *B60Q 3/60* (2017.02); *B60Q 3/43* (2017.02); *B64D 11/00* (2013.01); *F21V 3/02* (2013.01); *F21V 3/049* (2013.01); *B64D 2011/0038* (2013.01); *B64D 2203/00* (2013.01); *F21W 2106/00* (2018.01); *F21W 2107/30* (2018.01); *F21Y 2115/10* (2016.08)

(58) Field of Classification Search
CPC .. F21V 3/02; B64D 11/00; B60Q 3/43; B60Q 3/60
See application file for complete search history.

(56) References Cited

U.S. PATENT DOCUMENTS

| | | | |
|---|---|---|---|
| 7,441,931 B2 * | 10/2008 | Bayersdorfer | F16H 59/0278 362/489 |
| 7,857,484 B2 | 12/2010 | Marshall et al. | |
| 8,033,684 B2 | 10/2011 | Marshall et al. | |
| 9,731,824 B2 | 8/2017 | Madhav | |
| 10,091,567 B2 | 10/2018 | Schalla et al. | |
| 10,118,547 B2 * | 11/2018 | Duce | B60Q 3/51 |
| 10,791,386 B2 | 9/2020 | Schalla et al. | |
| 2015/0307033 A1 * | 10/2015 | Preisler | B60Q 3/20 296/1.08 |

\* cited by examiner

*Primary Examiner* — Evan P Dzierzynski
*Assistant Examiner* — Nathaniel J Lee
(74) *Attorney, Agent, or Firm* — COATS & BENNETT, PLLC

(57) ABSTRACT

Vehicle cabin structures comprising vehicle structure panels with embedded or associated lighting for producing changing and visually detected illuminated images appearing within the vehicle structure panels are disclosed with methods of their manufacture.

29 Claims, 14 Drawing Sheets

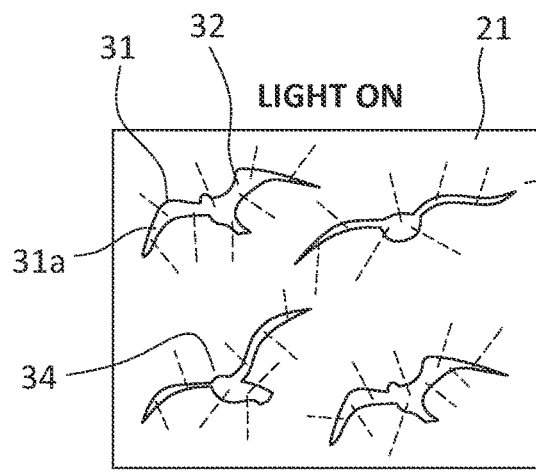
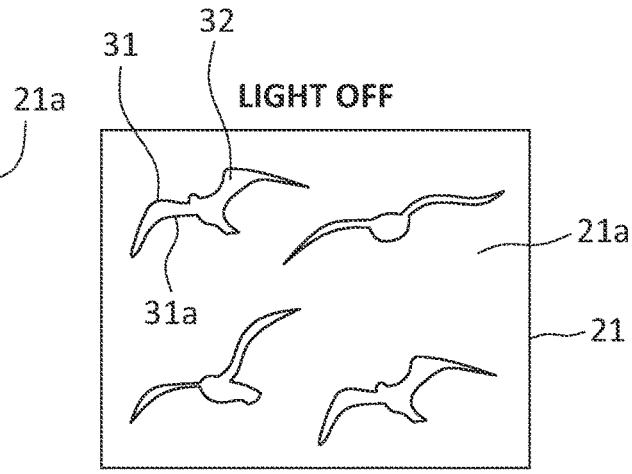
FIG. 6A  FIG. 6B
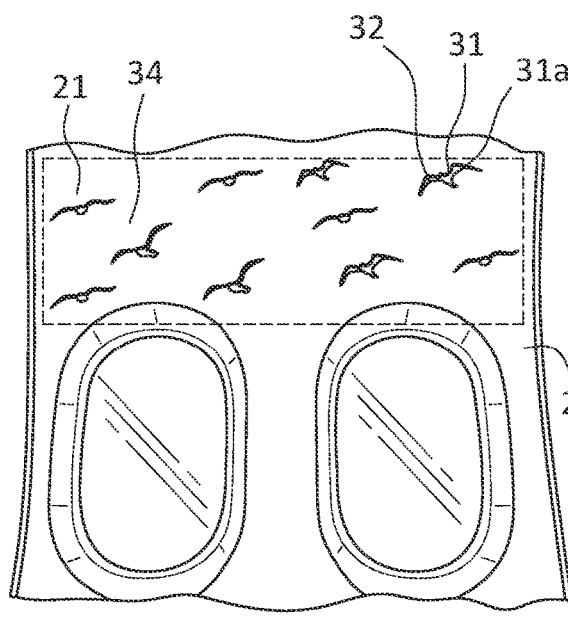
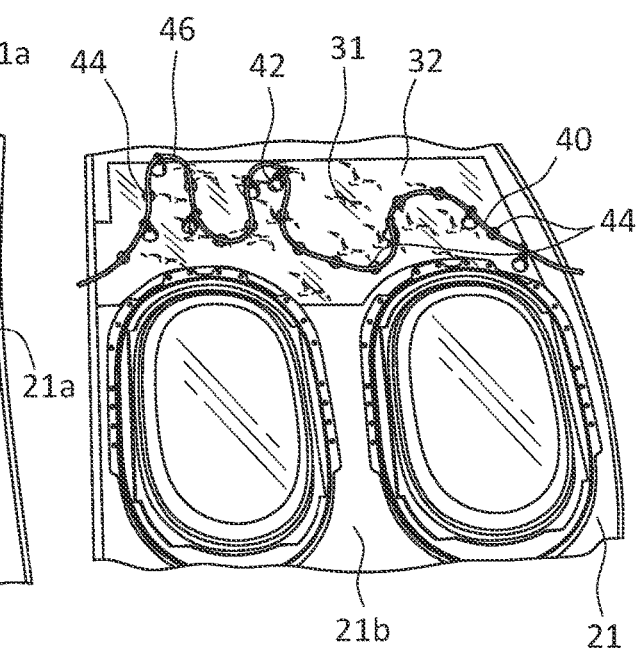
FIG. 7A  FIG. 7B

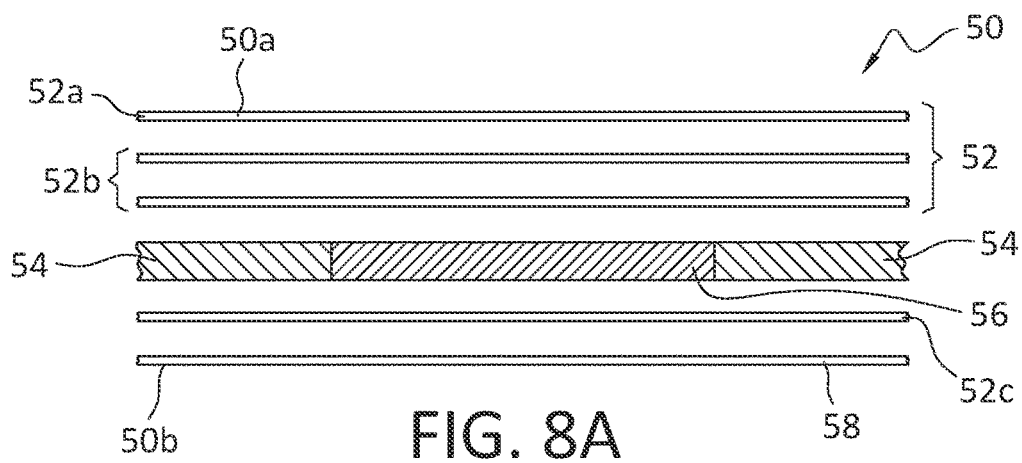
FIG. 8A
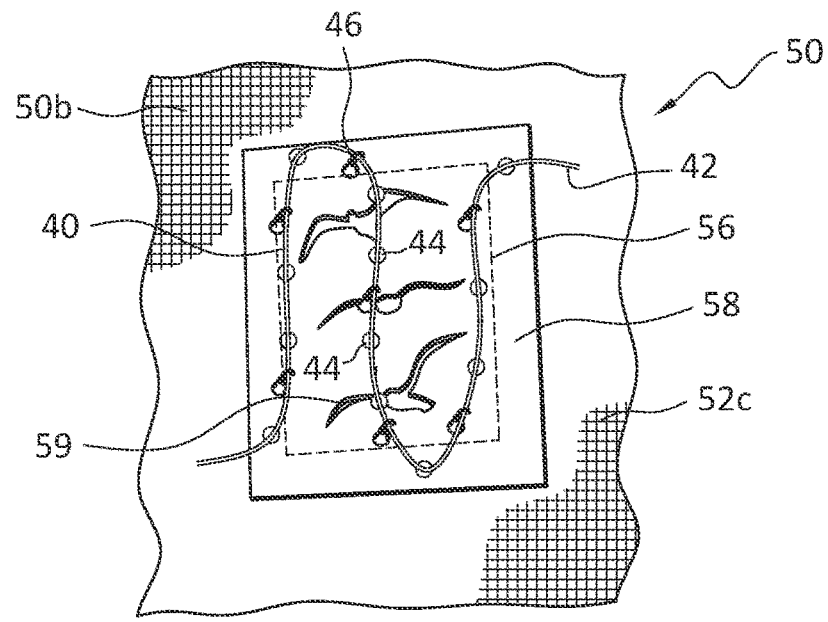
FIG. 8B
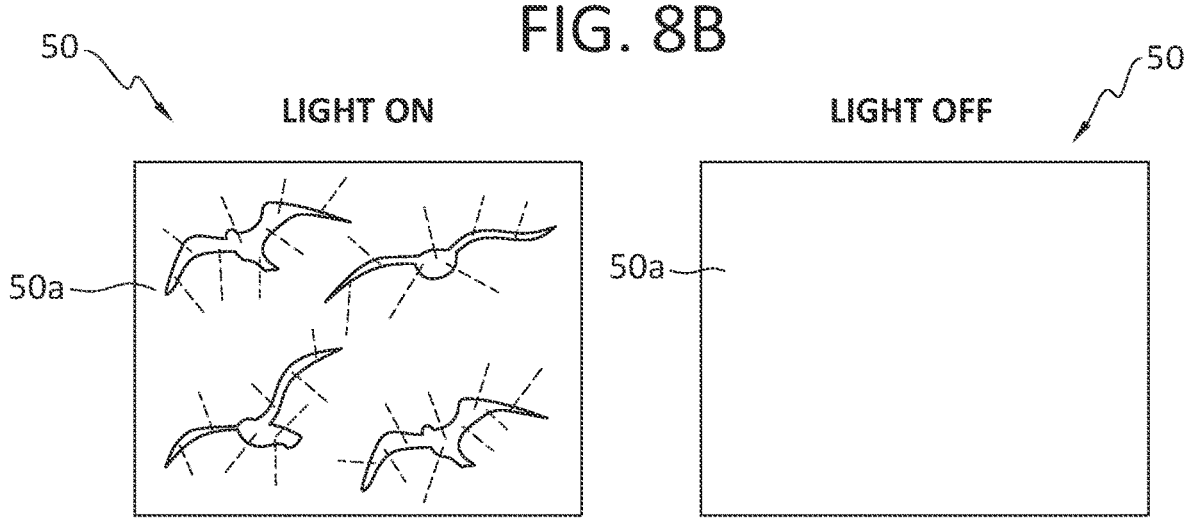
FIG. 8C
FIG. 8D

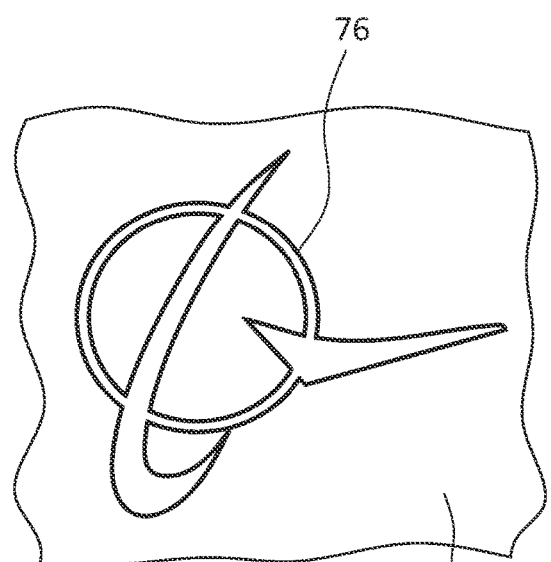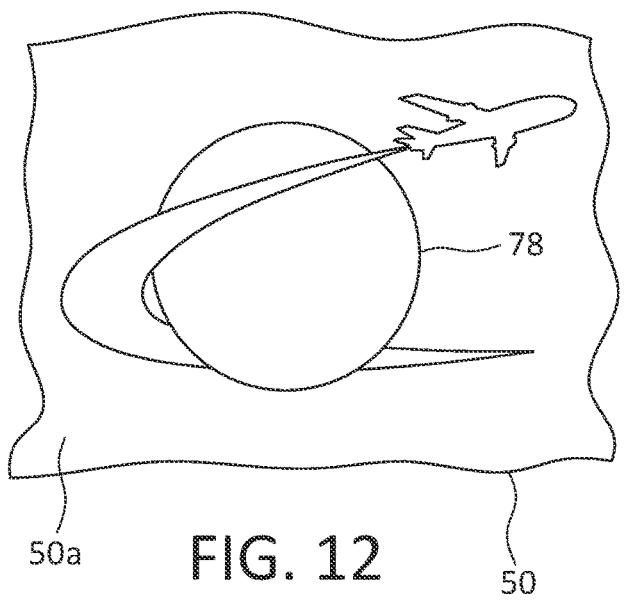

INVISIBLE LIGHTED FEATURE THROUGH A COMPOSITE PANEL

TECHNOLOGICAL FIELD

The present disclosure relates generally to the field of vehicle cabin lighting. More specifically the present disclosure relates to the field of selective and auxiliary aesthetic vehicle sidewall and vehicle cabin structure lighting.

BACKGROUND

Vehicle cabin lighting typically involves the positioning of dedicated light sources that may be visible or accessible to facilitate servicing, maintenance, rework, cleaning, etc. Due to vehicle cabin space constraints, such typical vehicle cabin lighting sources are typically at least partially visible and are typically located remotely from a vehicle cabin structure being illuminated.

Unless explicitly identified as such, no statement herein is admitted as prior art merely by its inclusion in the Technological Field and/or Background section.

SUMMARY

Present apparatuses, systems, and methods are directed to integrated decorative lighting for vehicle cabin structures that can house vehicle cabin panels with such integrated lighting solutions.

Present aspects are further directed to a vehicle cabin interior panel that includes a composite material substrate, with the composite material substrate including a composite material substrate first side and a composite material substrate second side. The composite material substrate further includes a first substrate material layer including a first substrate material layer first side, and a first substrate material layer second side, with the first substrate material layer comprising a first substrate material layer thickness. The vehicle cabin interior panel further includes a light diffuser material section, said light diffuser material section comprising a light diffuser material section first side and a light diffuser material section second side, said light diffuser material section further comprising a light diffuser material section thickness.

In another aspect, the first substrate material layer is a light impervious substrate material layer.

In another aspect, the first substrate material layer further includes at least one first substrate material layer throughopening extending through the first substrate material layer thickness.

In another aspect, the vehicle cabin interior panel further includes a light source configured to direct light from the light source to the light diffuser material section second side.

In another aspect, the light source is positioned a selected distance from the light diffuser material section second side, with the selected distance ranging from about 0 to about 1 inch.

A further present aspect is directed to a vehicle cabin interior panel including a composite material substrate, with the composite material substrate including a composite material substrate first side and a composite material substrate second side, with the composite material substrate further including a light pervious first substrate material layer that includes at least one light pervious first substrate material, with the light pervious first substrate material layer including a light pervious first substrate material layer thickness, wherein the light pervious first substrate material layer first side is a vehicle cabin interior panel exposed outer surface. The composite material substrate further includes a structural core layer including a structural core layer first side and a structural core layer second side, with the structural core layer first side positioned adjacent to the light pervious first substrate material layer second side, and with the structural core layer including a structural core layer thickness, with the structural core layer further including at least one structural core layer cutout section. The composite material substrate further includes a light diffuser material section, with the light diffuser material section including a light diffuser material section first side and a light diffuser material section second side, with the light diffuser material section further including a light diffuser material section thickness.

In another aspect, the structural core layer cutout section includes a structural core layer cutout section cutout area.

In another aspect, the light diffuser material section is dimensioned to at least substantially match the structural core layer section cutout section cutout area.

In a further aspect, the light diffuser material section thickness is substantially equivalent to said structural core layer thickness.

In another aspect, the light diffuser material section includes at least one of a transparent material, a translucent material, and combinations thereof.

In a further aspect, the light diffuser material section includes a light transmissive material.

In another aspect, the light diffuser material section includes a material made from at least one of polycarbonate, acrylic, and combinations thereof.

In another aspect, the composite material substrate further includes a light pervious second substrate material layer positioned adjacent the structural core layer second side and the light diffuser material section second side.

In another aspect, the composite material substrate further includes a light impervious substrate material layer (the "doubler/stencil material" e.g., having the cutout), with the light impervious substrate material layer comprising a light impervious substrate material layer thickness, wherein the light pervious first substrate material, the structural core layer, the light diffuser material section, the light pervious second substrate material layer and the light impervious substrate material layer in combination form the vehicle cabin interior panel.

In another aspect, the light impervious substrate material (doubler/blocker) includes at least one light impervious substrate material layer cutout extending through the light impervious substrate material layer thickness.

In another aspect, the light impervious substrate material layer is positioned adjacent the light pervious second substrate material layer second side and at least a section of said light diffuser material section second side.

In another aspect, the light pervious first substrate material, the structural core layer, the light diffuser material section, the light pervious second substrate material layer and the light impervious substrate material layer are co-curable.

In another aspect, the light pervious first substrate material, the structural core layer, the light diffuser material section, the light pervious second substrate material layer and the light impervious substrate material layer are co-curable within a temperature ranging from about 240° F. to about 260° F.

In another aspect, the light pervious first substrate material and the structural core layer are co-curable within a temperature ranging from about 240° F. to about 260° F.

Further present aspects are directed to a system for selectively illuminating at least a portion of at least one of a plurality of vehicle cabin interior panels in a vehicle cabin interior, the system including a vehicle cabin interior panel including a composite material substrate, with the composite material substrate including a composite material substrate first side and a composite material substrate second side. The composite material substrate further includes a first substrate material layer including at least one first substrate material layer first side, and a first substrate material layer second side, with the first substrate material layer comprising a first substrate material layer thickness, with the first substrate material layer including a first substrate material layer through-opening extending through the first substrate material thickness. The system further includes a light diffuser material section, with the light diffuser material section comprising a light diffuser material section first side and a light diffuser material section second side, and with the light diffuser material section further including a light diffuser material section thickness. The system further includes a light source in communication with the light diffuser material section second side, with the light source configured to direct light from the light source to light diffuser material section second side, with the light source further in communication with a power source. The system further includes a controller in communication with at least one of the light source and said controller.

A further present aspect if directed to a system for selectively illuminating at least a portion of at least one of a plurality of vehicle cabin interior panels in a vehicle cabin interior, the system including a vehicle cabin interior panel including a composite material substrate, with the composite material substrate including a composite material substrate first side and a composite material substrate second side, with the composite material substrate further including a light pervious first substrate material layer that includes at least one light pervious first substrate material, with the light pervious first substrate material layer including a light pervious first substrate material layer thickness. The composite material substrate further includes a structural core layer including a structural core layer first side and a structural core layer second side, with the structural core layer first side positioned adjacent to the light pervious first substrate material layer second side, and with the structural core layer including a structural core layer thickness, with the structural core layer further including at least one structural core layer cutout section having at least one structural core layer cutout section area. The composite material substrate further includes a light diffuser material section, with the light diffuser material section including a light diffuser material section first side and a light diffuser material section second side, with the light diffuser material section further including a light diffuser material section thickness, with the light diffuse material section dimensioned and configured to substantially and match and occupy the at least one structural core layer cutout section area. The composite material substrate further includes a light impervious substrate material layer, with the light impervious substrate material layer comprising a light impervious substrate material layer thickness, with the light impervious substrate material layer including at least one light impervious substrate material layer cutout extending through the light impervious substrate material layer thickness. The system further includes a light source positioned adjacent to the light impervious substrate material cutout, with the light source configured to direct light from the light source to light diffuser material section second side (interior), said light source further in communication with a power source. The system further includes a controller in communication with at least one of the light source and said controller.

In another aspect, the composite material substrate in the system further includes a light pervious second substrate material layer including at least one light pervious second substrate material layer, with the light pervious second substrate material layer positioned adjacent the structural core layer second side and the light diffuser material section second side.

In another aspect, the system further includes a programmable sequencer in communication with at least one of the controller and the light source.

In another aspect, the light source is configured to effect a selected color change sequence.

In a further aspect, the light diffuser material section comprises a translucent material, said translucent material comprising a plurality of differently colored sections.

In another aspect, the light diffuser material section comprises a polycarbonate material.

In another aspect, the light source comprises a LED PAR lighting component.

In a further aspect, in operation the system is configured to form a visually detectable selected illuminated scene over an area comprising at least two adjacently positioned vehicle cabin structures.

In another aspect, the at least two adjacently positioned vehicle cabin structures comprise at least one of an aircraft cabin sidewall, an aircraft cabin storage bin, an aircraft cabin closet, an aircraft cabin ceiling, an aircraft lavatory door, an aircraft cabin floor.

Another present aspect is directed to a vehicle including at least one of the presently disclosed vehicle cabin interior panels.

A further present aspect is directed to an aircraft including at least one of the presently disclosed vehicle cabin interior panels.

Another present aspect is directed to a vehicle including at least one of the presently disclosed systems.

A further present aspect is directed to an aircraft including at least one of the presently disclosed systems.

A further present aspect is directed to a method for producing a selected illuminated image within a plurality of adjacent vehicle cabin structures in a passenger vehicle cabin, the method including providing a first vehicle cabin structure adjacent to a second vehicle cabin structure, with the first vehicle cabin structure including a first vehicle cabin panel, with the second vehicle cabin structure comprising a second vehicle cabin panel, with the first vehicle cabin panel and the second vehicle cabin panel each including a vehicle cabin panel first region (that can be a light-blocked region) and a vehicle cabin panel second region (that can be a light transmissive region). The method further includes activating at least one light source, said light source positioned adjacent the vehicle cabin panel second side, blocking a selected amount of light from passing through the vehicle cabin panel first region, transmitting a selected amount of light from the light source to at least one vehicle cabin panel second side, emitting a selected amount of light from at least one of the first and second vehicle cabin panel s into a vehicle cabin through at least one vehicle cabin panel at a vehicle cabin section comprising the first substrate material layer through-opening, and controlling (including, e.g., sequencing, etc.) via a controller light emitted from at least one of the first vehicle cabin panel and the second vehicle cabin panel to form an illuminated image in at least one of the first vehicle cabin panel and the second vehicle cabin panel, with the illuminated image configured to extend beyond a first vehicle cabin structure boundary to at least one adjacently positioned vehicle cabin panel.

In another aspect of the method, the first and second vehicle cabin structures each include a composite material substrate, with the composite material substrate including a composite material substrate first side and a composite material substrate second side. The composite material substrate further includes a first substrate material layer including at least one first substrate material layer first side, and a first substrate material layer second side, with the first substrate material layer comprising a first substrate material layer thickness and a first substrate material layer through-opening extending through the first substrate material layer thickness. The first and second vehicle cabin interior panels each further include a light diffuser material section, with the light diffuser material section comprising a light diffuser material section first side and a light diffuser material section second side, said light diffuser material section further comprising a light diffuser material section thickness.

A further present aspect is directed to a method for producing a selected illuminated image within a plurality of adjacent vehicle cabin structures in a passenger vehicle cabin, the method including providing a first vehicle cabin structure adjacent to a second vehicle cabin structure, with the first vehicle cabin structure including a first vehicle cabin panel, with the second vehicle cabin structure comprising a second vehicle cabin panel, with the first vehicle cabin panel and the second vehicle cabin panel each including a vehicle cabin panel first region and a vehicle cabin panel second region. Each of the first and second vehicle cabin panels further including a composite material substrate, with the composite material substrate including a composite material substrate first side and a composite material substrate second side, with the composite material substrate further including a light pervious first substrate material layer that includes at least one light pervious first substrate material, with the light pervious first substrate material layer including a light pervious first substrate material layer thickness. The composite material substrate further includes a structural core layer including a structural core layer first side and a structural core layer second side (interior), with the structural core layer first side positioned adjacent to the light pervious first substrate material layer second side, and with the structural core layer including a structural core layer thickness, with the structural core layer further including at least one structural core layer cutout section having at least one structural core layer cutout section area. The composite material substrate further includes a light diffuser material section, with the light diffuser material section including a light diffuser material section first side and a light diffuser material section second side, with the light diffuser material section further including a light diffuser material section thickness, with the light diffuse material section dimensioned and configured to substantially and match and occupy the at least one structural core layer cutout section area. The composite material substrate further includes a light impervious substrate material layer, with the light impervious substrate material layer comprising a light impervious substrate material layer thickness, with the light impervious substrate material layer including at least one light impervious substrate material layer cutout extending through the light impervious substrate material layer thickness. The method further includes activating at least one light source, said light source positioned adjacent the vehicle cabin panel second side (interior), blocking a selected amount of light from passing through the vehicle cabin panel first region (the "blocked" region), transmitting a selected amount of light from the light source to at least one vehicle cabin panel second side, emitting a selected amount of light from at least one vehicle cabin panel into a vehicle cabin through at least one vehicle cabin panel second region, said vehicle cabin panel second region configured to appear as an illuminated image, and controlling (including, e.g., sequencing, etc.) via a controller light emitted from at least one of the first vehicle cabin panel and the second vehicle cabin panel to form an illuminated scene, said illuminated image configured to extend beyond a first vehicle cabin structure boundary to at least one adjacently positioned vehicle cabin panel.

In another aspect, the illuminated image is configured to impart a visually detected stationary design.

In another aspect, the illuminated image is configured to impart visually detected motion in the illuminated image.

In another aspect, the illuminated image is configured to impart a plurality of visually detected colors in the illuminated scene.

In another aspect, a method further includes installing the first vehicle cabin interior panel in the first vehicle cabin structure, installing the second vehicle cabin interior panel in the second vehicle cabin structure.

In another aspect, the composite material substrate, the light pervious first substrate material layer, the structural core layer, the light diffuser material section, and the light impervious substrate material layer are co-cured.

In another aspect, the light pervious first substrate material layer and the structural core layer are co-cured.

In another aspect, the plurality of adjacently positioned vehicle cabin structures each comprise at least one of an aircraft cabin sidewall, an aircraft cabin storage bin, an aircraft cabin closet, an aircraft cabin ceiling, an aircraft cabin floor, an aircraft lavatory door, and combinations thereof.

The features, functions and advantages that have been discussed can be achieved independently in various aspects or may be combined in yet other aspects, further details of which can be seen with reference to the following description and the drawings.

BRIEF DESCRIPTION OF THE DRAWINGS

Figure 1:
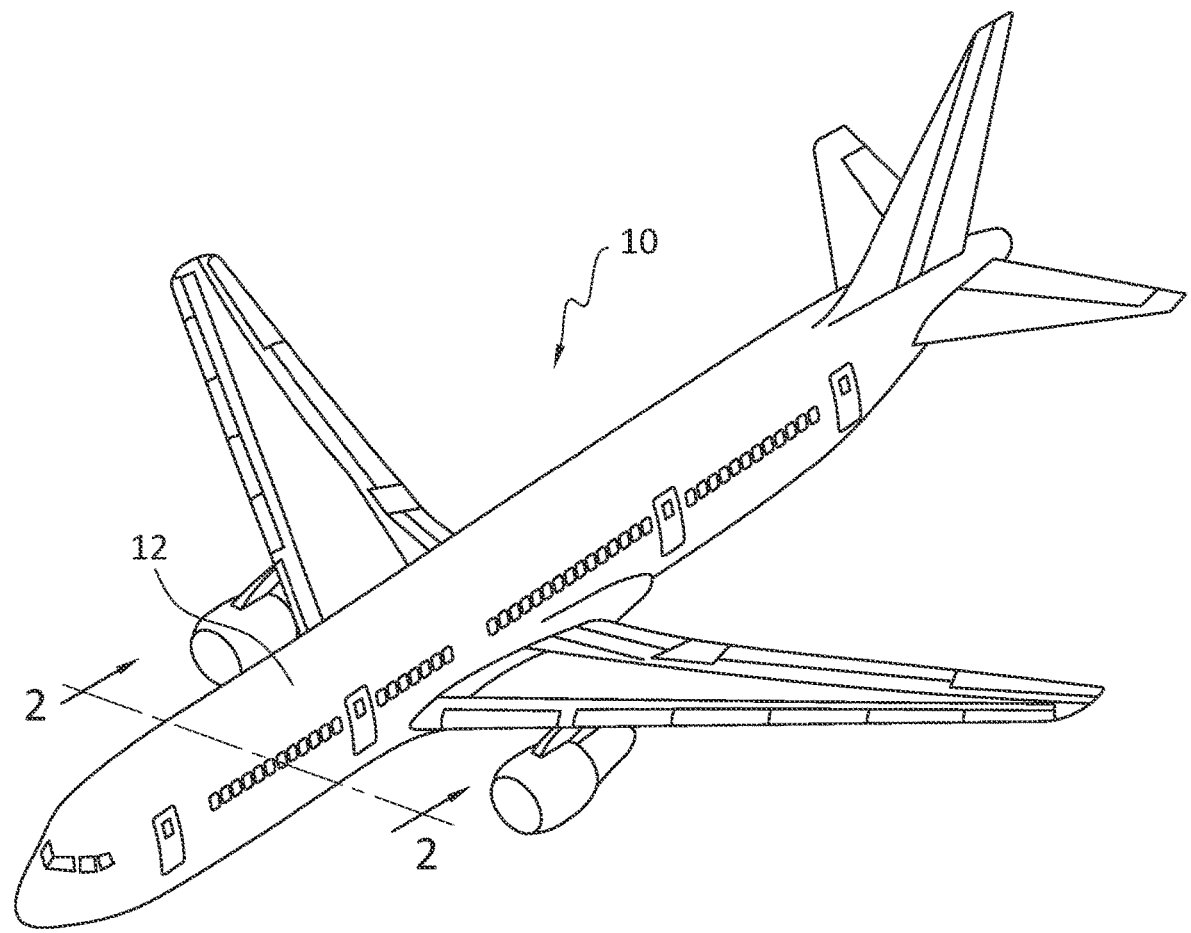
Figure 2:
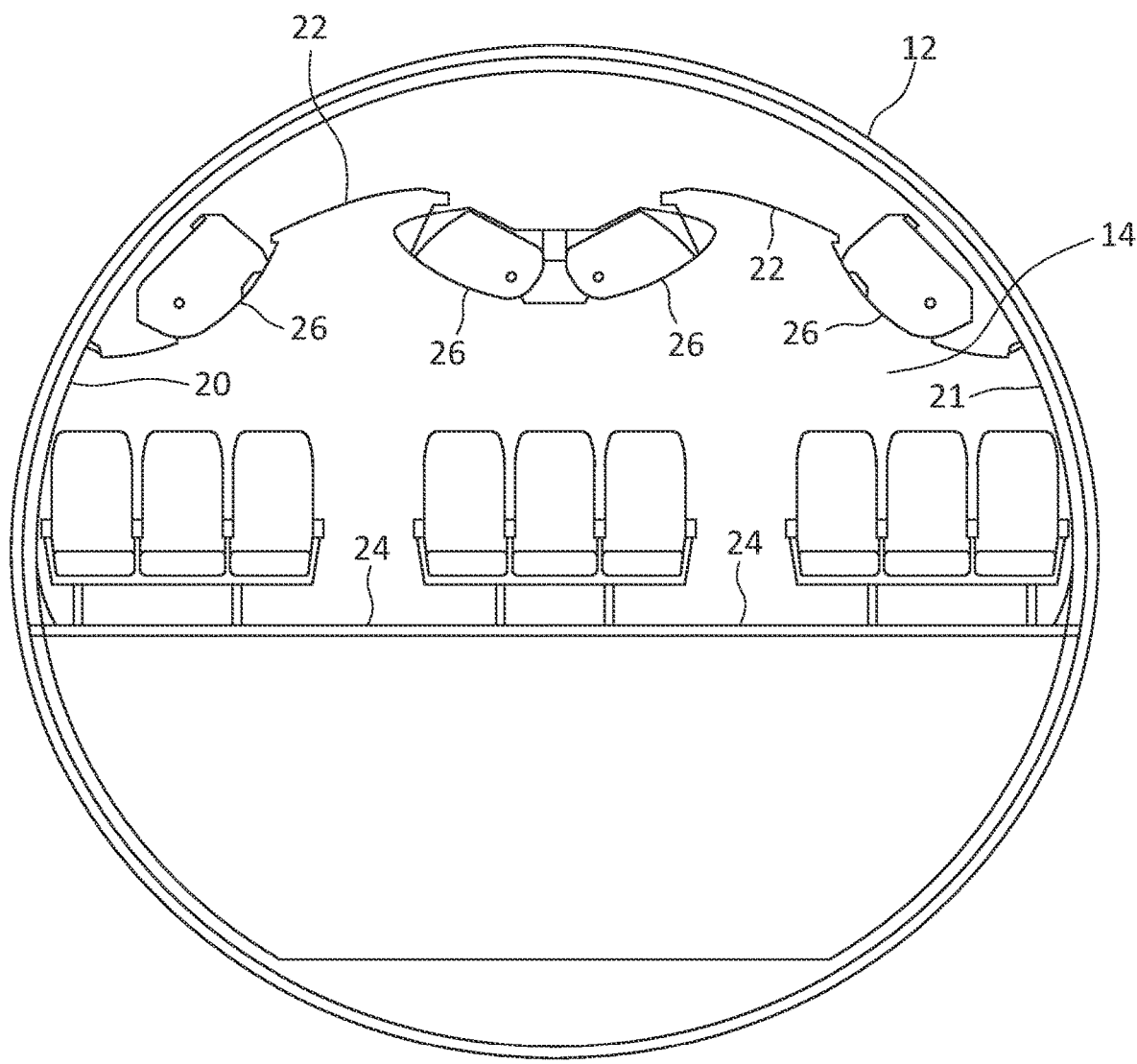
Figure 3:
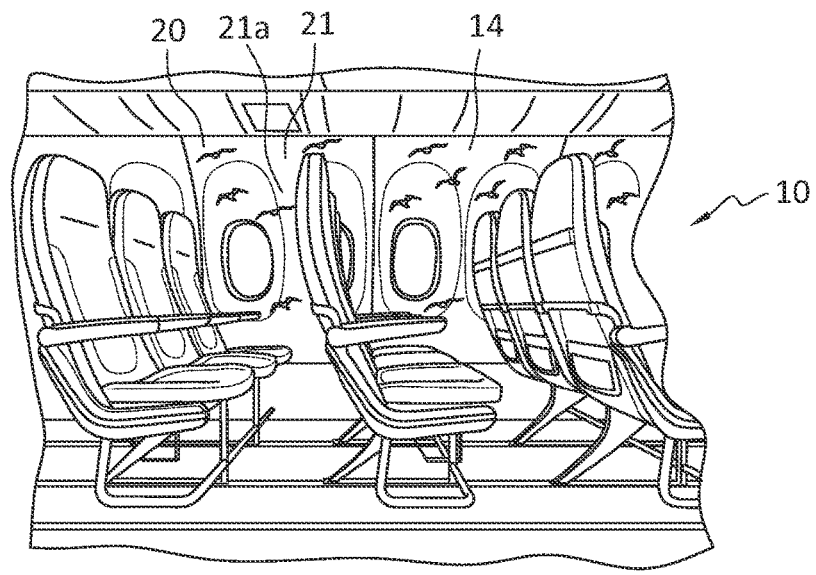
Figure 4:
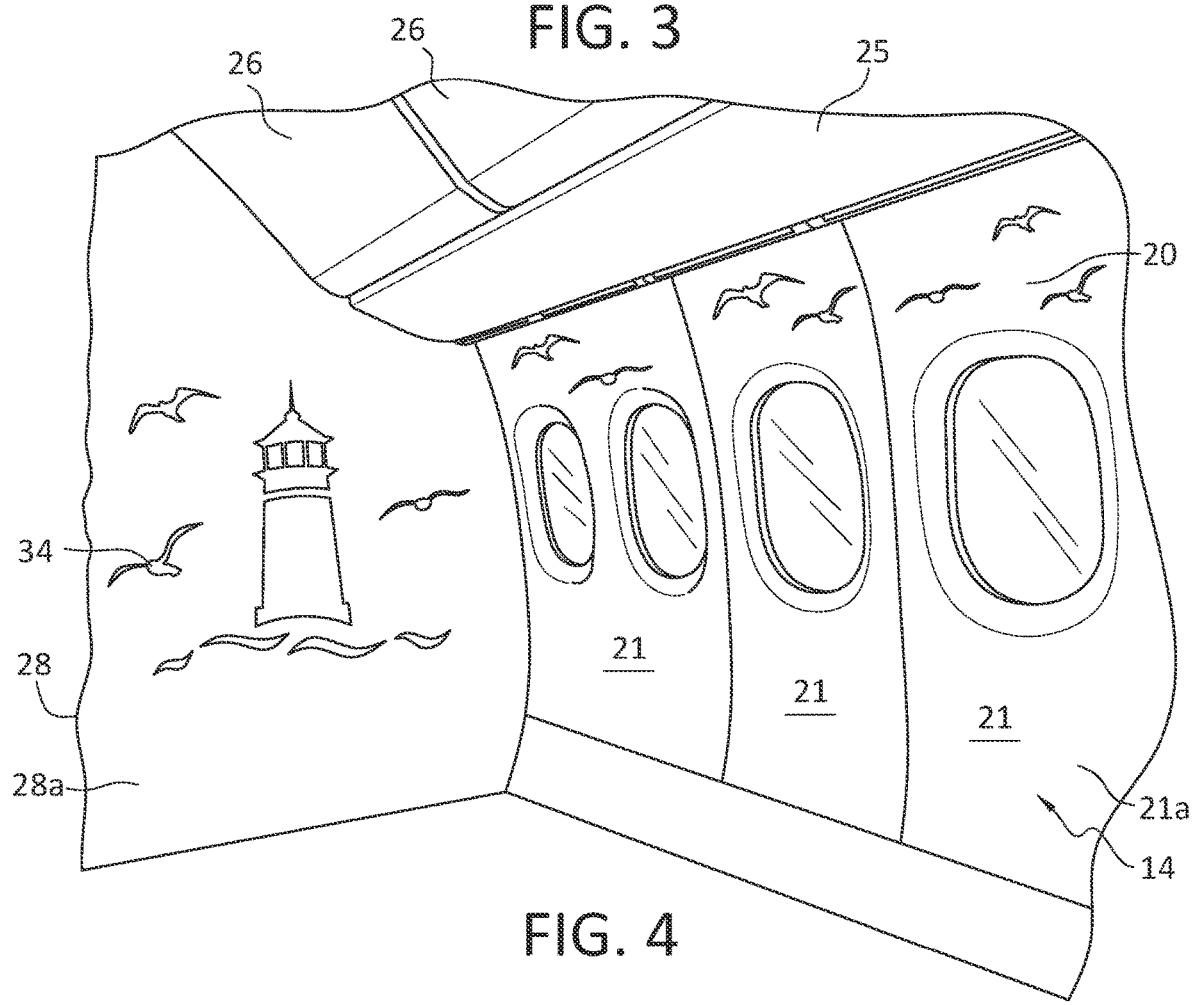
Figure 5A:
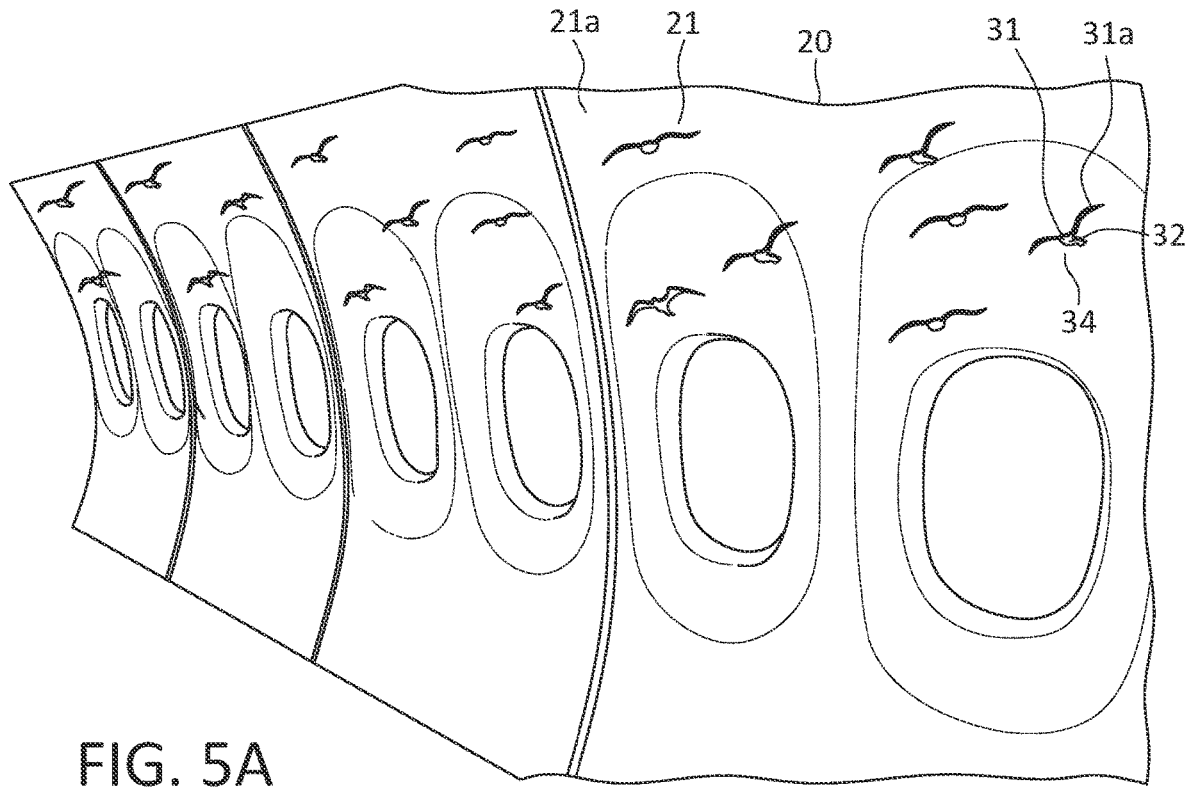
Figure 5B:
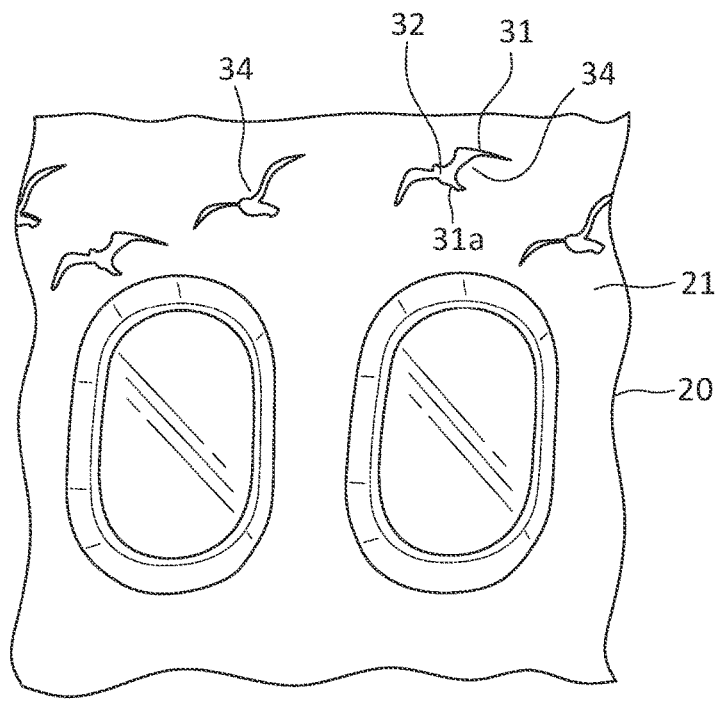
Figure 9A:
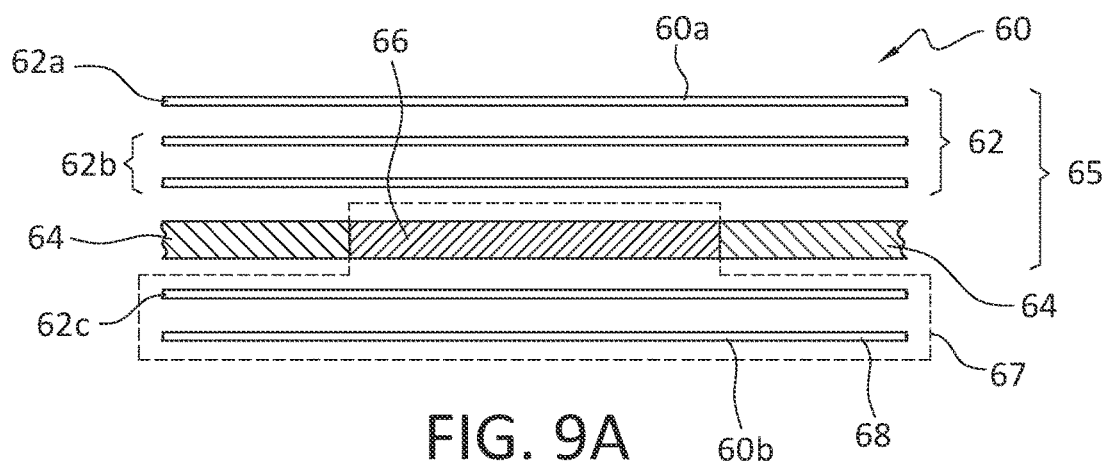
Figure 9B:
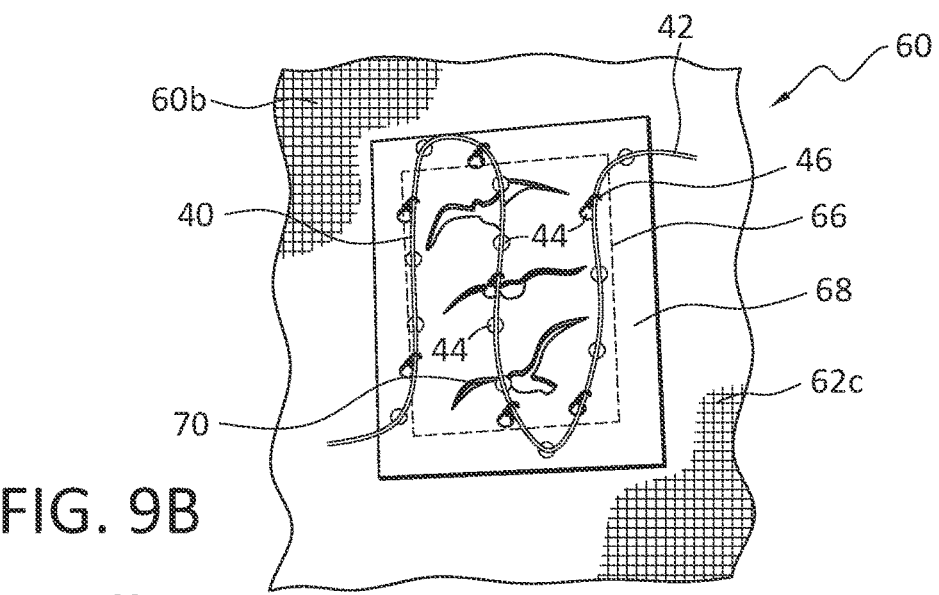
Figures 9C, 9D:
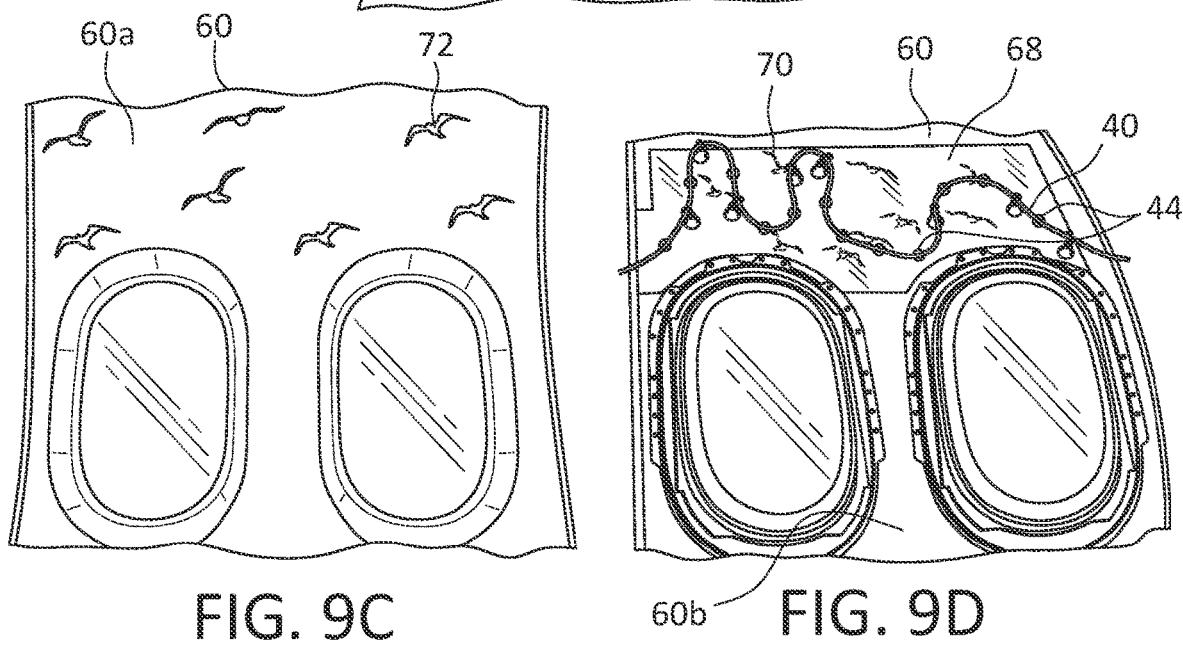
Figure 10A:
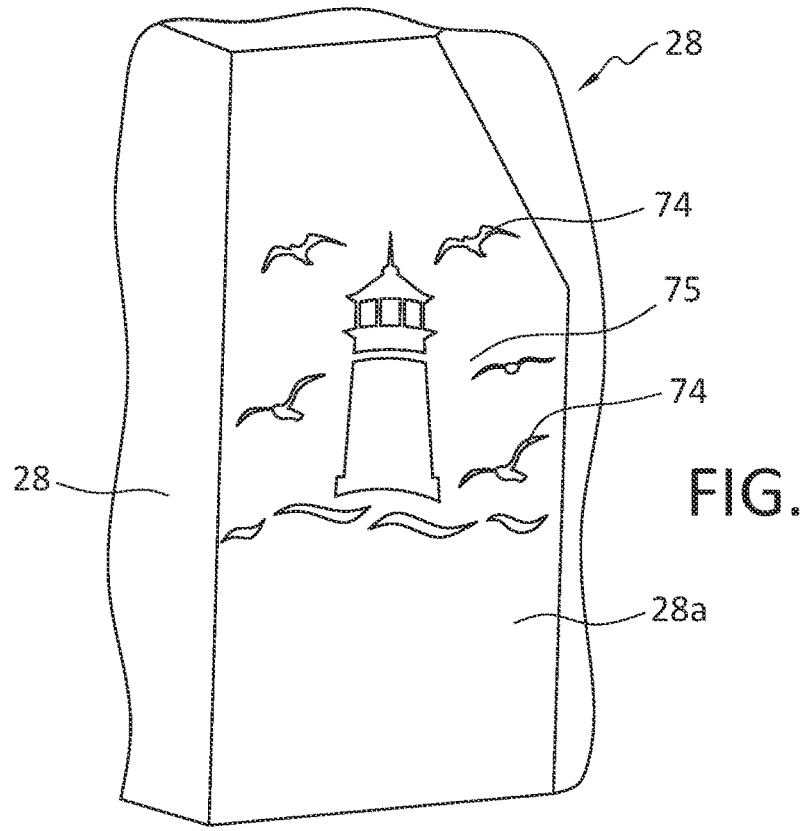
Figure 10B:
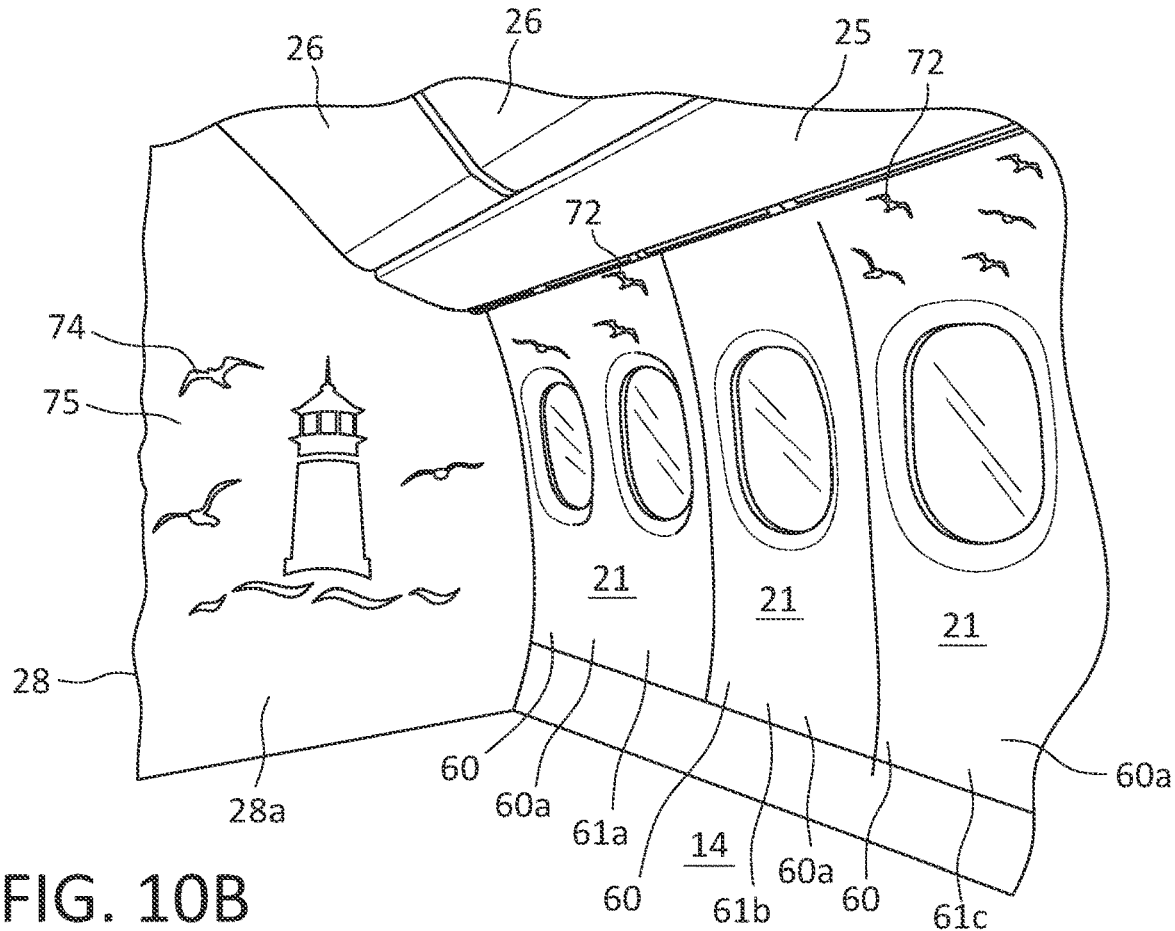
Figure 10C:
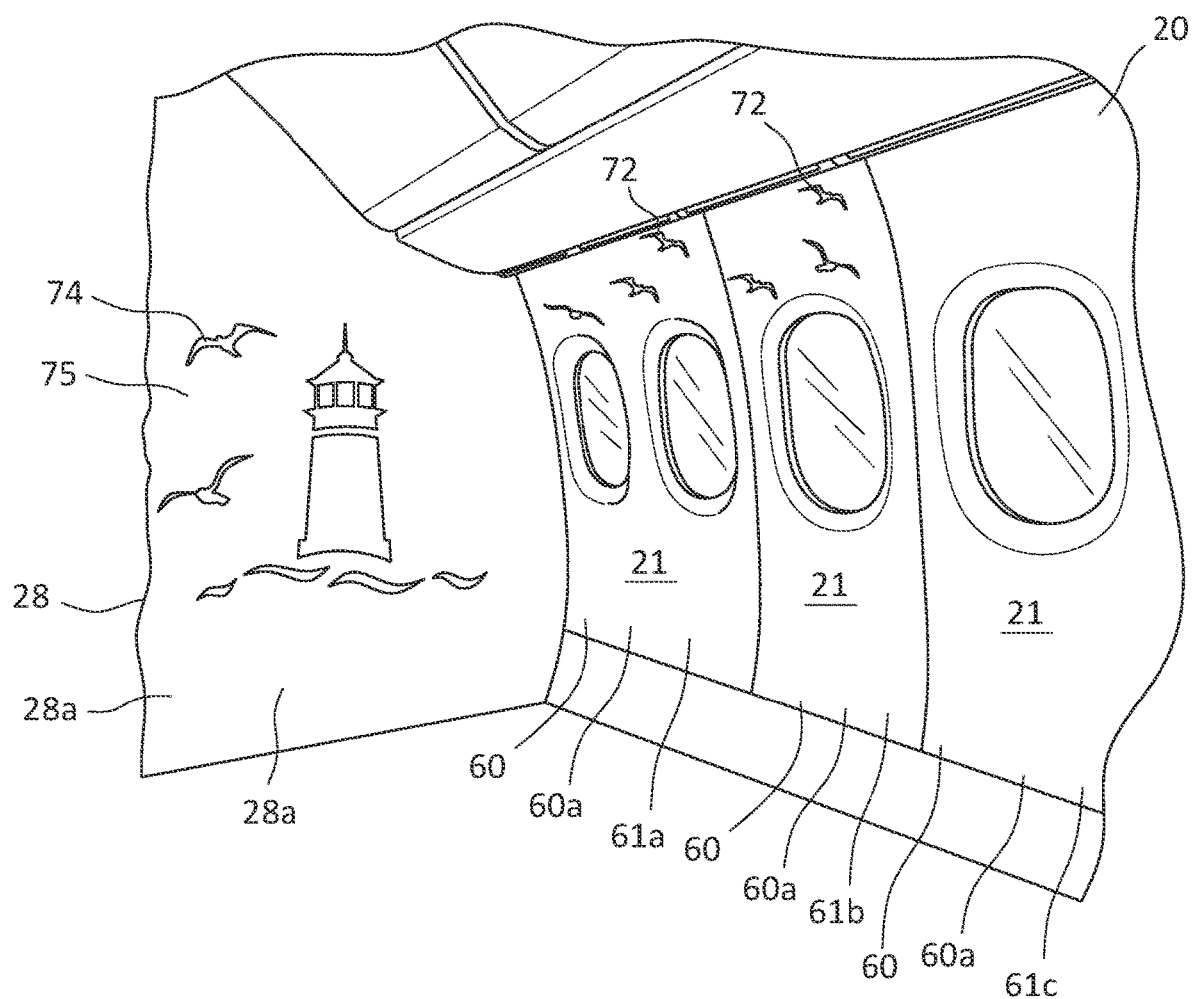
Figure 10D:
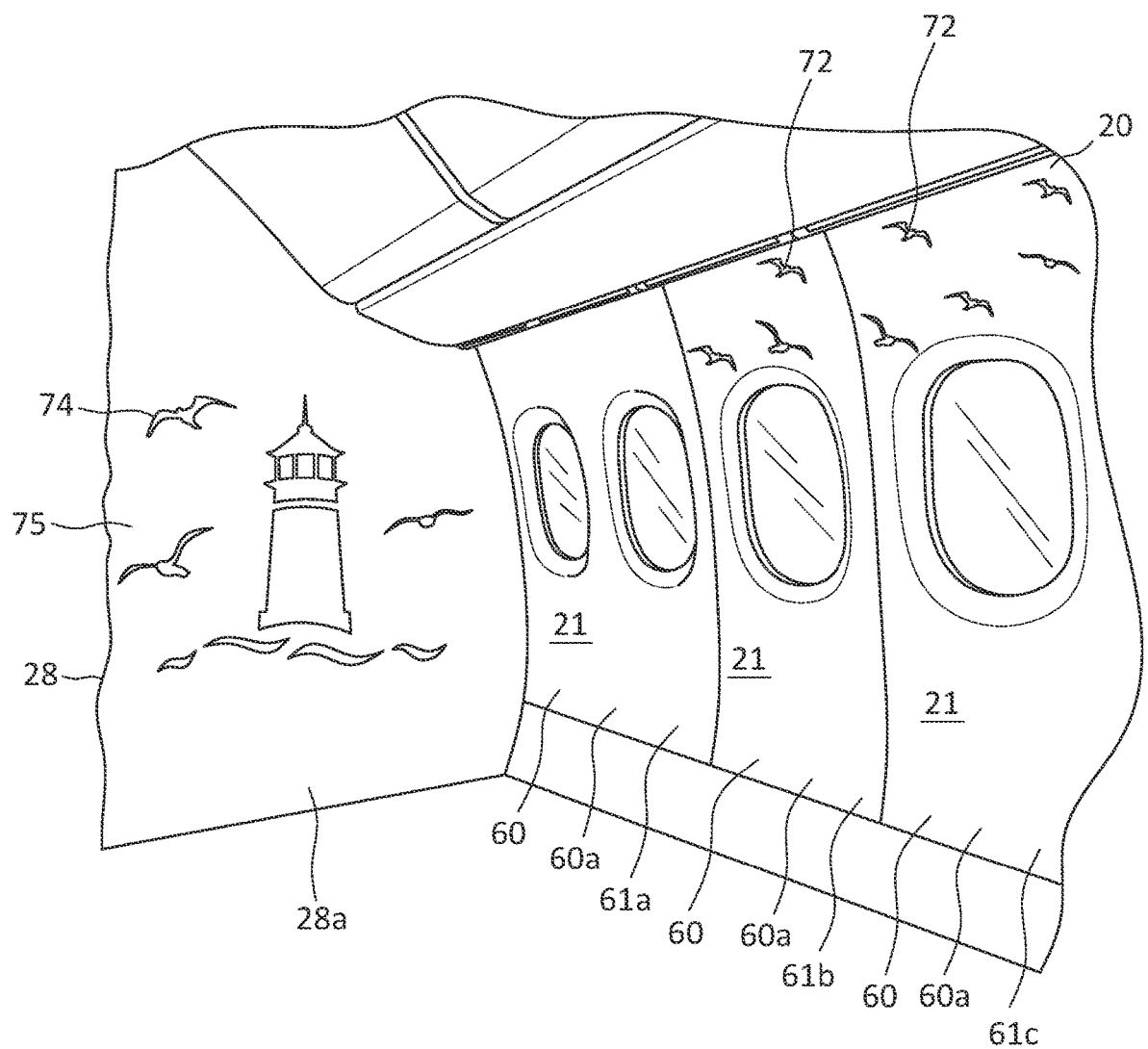
Figure 13:
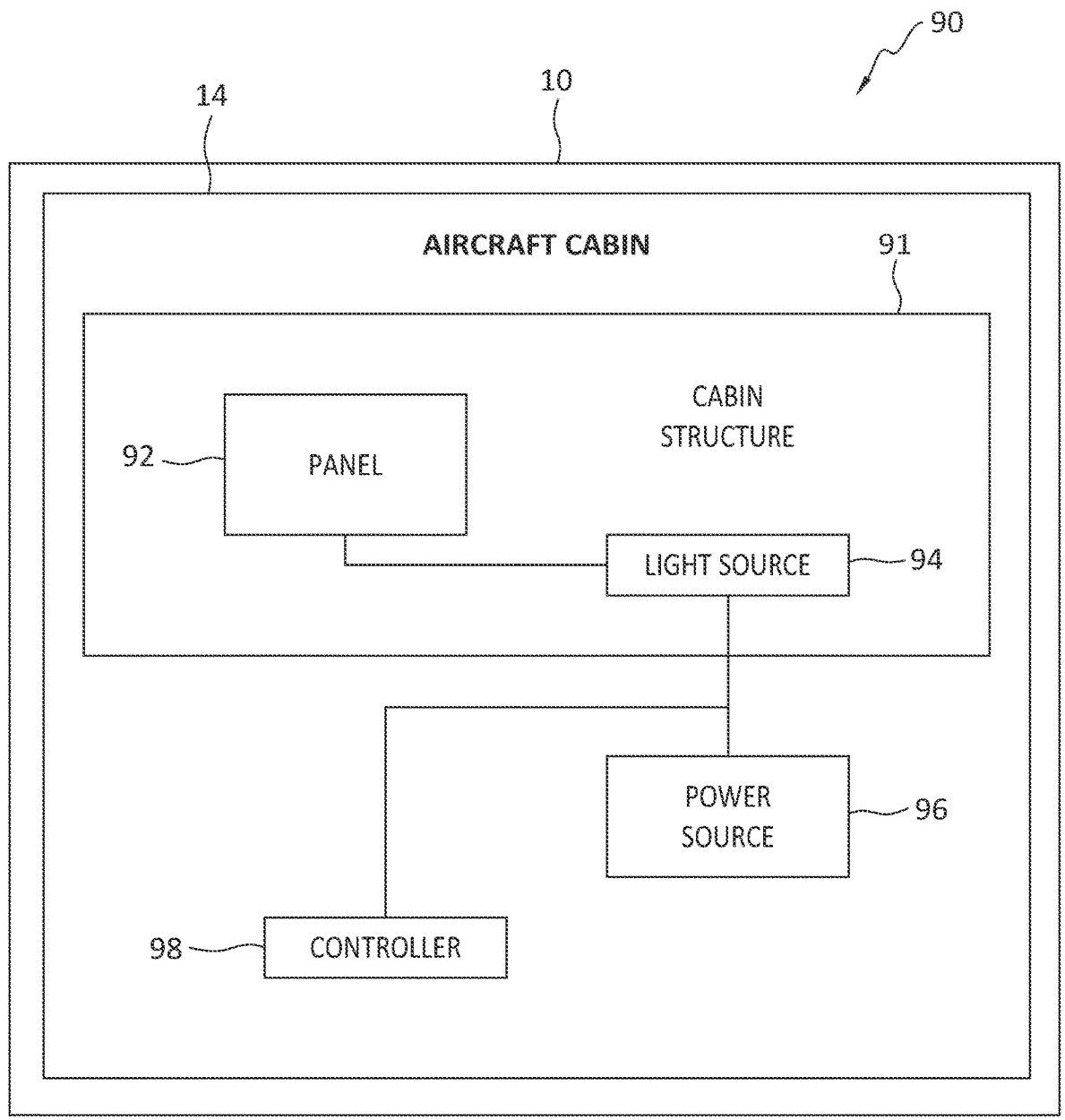
Figure 14:
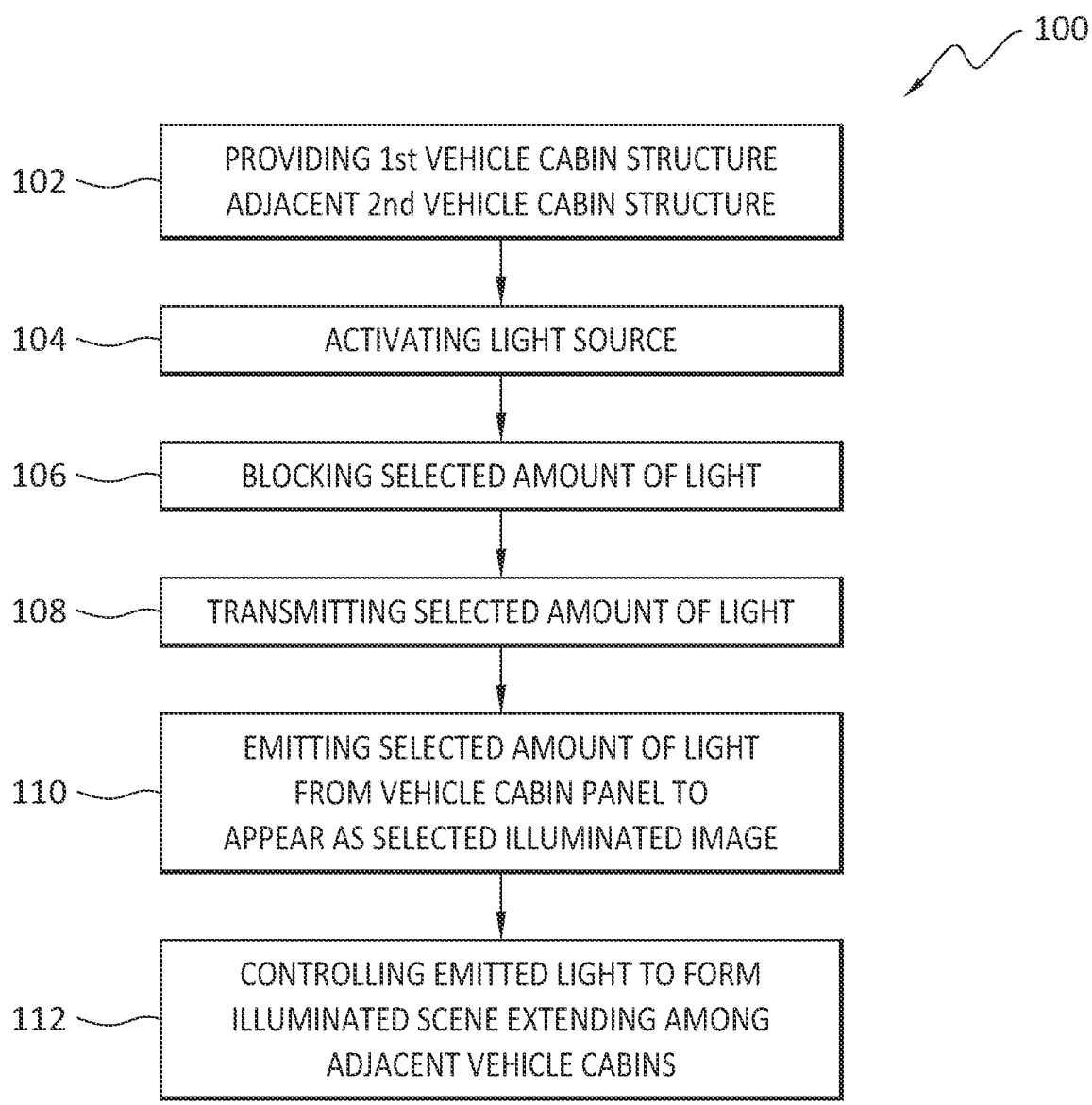

Having thus described variations of the disclosure in general terms, reference will now be made to the accompanying drawings, which are not necessarily drawn to scale, and wherein:

FIG. 1 is an illustration of a vehicle in the form of an aircraft, according to present aspects;

FIG. 2 is a cross-section view of a vehicle cabin, according to present aspects;

FIG. 3 is an outboard partial view of a vehicle cabin from within the vehicle cabin, according to present aspects;

FIG. 4 is a partial view of a vehicle cabin from within the vehicle cabin, according to present aspects;

FIG. 5A is a partial view of a vehicle cabin sidewall, according to present aspects;

FIG. 5B is an enlarged view of a vehicle cabin sidewall panel, according to present aspects;

FIG. 6A is an enlarged view of a section of an illuminated image in a vehicle cabin sidewall panel, according to present aspects;

FIG. 6B is an enlarged view of the section of the vehicle cabin sidewall panel of FIG. 6A in a non-illuminated state, according to present aspects;

FIG. 7A is an outboard view of a sidewall panel, according to present aspects;

FIG. 7B is a view of the reverse interior of the sidewall panel of FIG. 7A, according to present aspects;

FIG. 8A is a cross-sectional exploded side view of a sidewall panel, according to present aspects;

FIG. 8B is a view of the reverse interior of the sidewall panel of FIG. 8A, according to present aspects;

FIG. 8C is an enlarged view of a section of the sidewall panel of FIGS. 8A, 8B showing an illuminated image, according to present aspects;

FIG. 8D is an enlarged view of a section of the sidewall panel of FIGS. 8A, 8B in a non-illuminated state, according to present aspects;

FIG. 9A is a cross-sectional exploded side view of a sidewall panel, according to present aspects;

FIG. 9B is a view of the reverse interior of the sidewall panel of FIG. 9A, according to present aspects;

FIG. 9C is a view of the sidewall panel exterior surface of FIG. 9A, 9B, according to present aspects;

FIG. 9D is an enlarged view of the reverse interior of the sidewall panel of FIG. 9C, according to present aspects;

FIG. 10A is a cabin view of a vehicle cabin partition wall and vehicle cabin partition wall panel, according to present aspects;

FIG. 10B is a cabin view of a vehicle cabin sidewall and an adjacently positioned vehicle cabin partition wall, according to present aspects;

FIG. 10C is a cabin view of a vehicle cabin sidewall and an adjacently positioned vehicle cabin partition wall, according to present aspects;

FIG. 10D is a cabin view of a vehicle cabin sidewall and an adjacently positioned vehicle cabin partition wall, according to present aspects;

FIG. 11 is an enlarged view of a vehicle cabin structure and vehicle cabin structure panel, according to present aspects;

FIG. 12 is an enlarged view of a vehicle cabin structure and vehicle cabin structure panel, according to present aspects;

FIG. 13 is a block diagram illustrating system components, according to present aspects;

FIG. 14 is a flowchart outlining a method, according to present aspects; and

Figure 15:
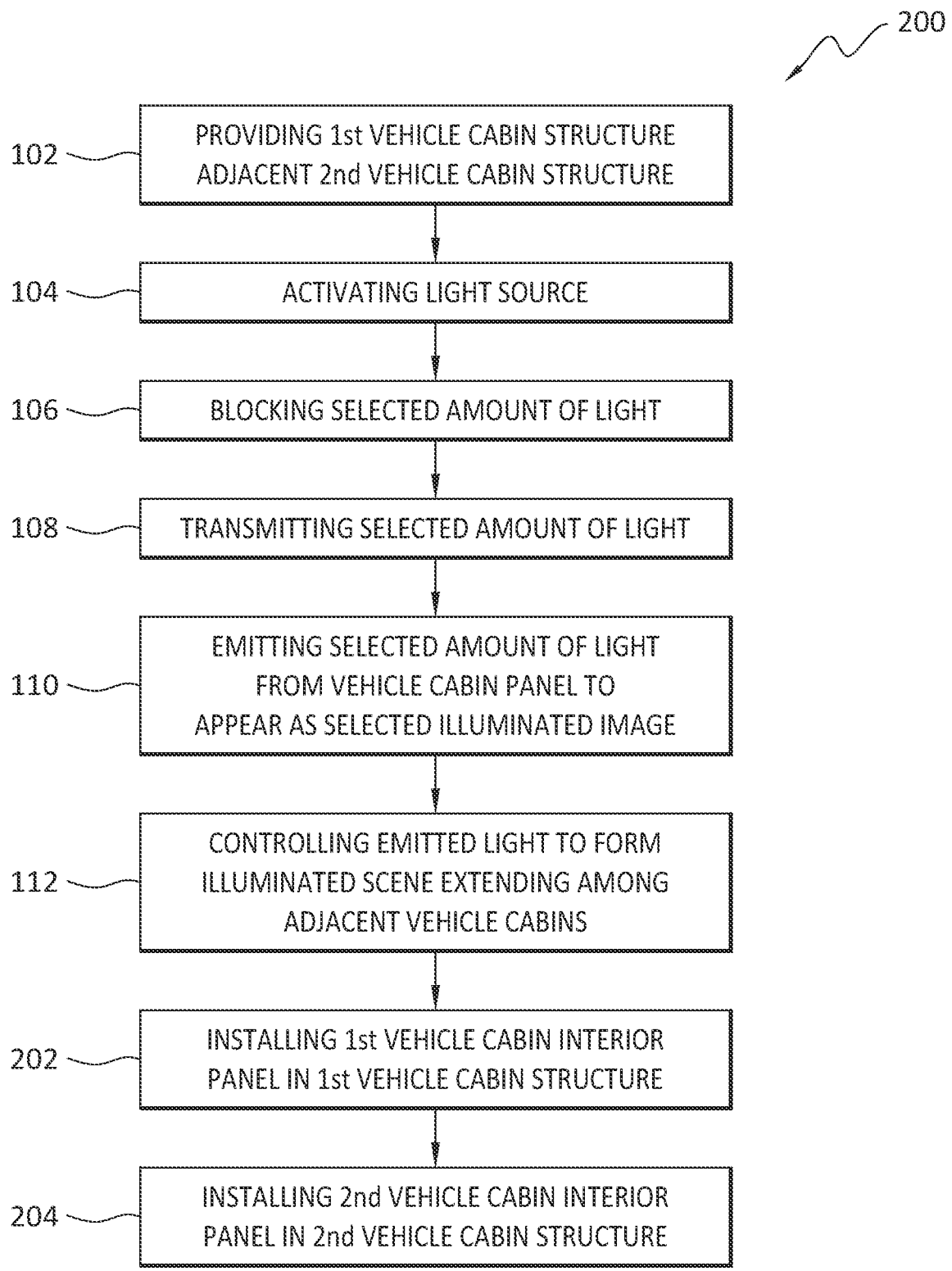

FIG. 15 is a flowchart outlining a method, according to present aspects.

DETAILED DESCRIPTION

According to present aspects, vehicle cabin environments are enhanced through the incorporation of visually perceived lighting effects presented from existing vehicle cabin structures. Present aspects disclose incorporating a lighting system or lighting "scheme" into confined areas behind existing structures, and altering the structures to selectively allow lighted images to pass through vehicle cabin structures, that can be adjacently positioned vehicle cabin structures, when a light source is illuminated. The present apparatuses, systems, and methods can allow vehicle cabin structures to "hide" illuminated effects, with the modified vehicle cabin structures appearing "normal" in a non-illuminated state, and otherwise not displaying selected images from the vehicle cabin structures when the systems are not in a illuminated state and no light is emitted from a light source associated with present systems.

According to present aspects, adjacently-positioned vehicle cabin structures that incorporate present apparatuses, systems, and methods, when operationally configure to illuminate, can selectively illuminate a selected image or plurality of selected images that can appear to "travel" or otherwise "move" from within a single structure, and/or appear to "travel" or otherwise "move" across more than one adjacently-positioned vehicle cabin structure. Such illumination can be visually detected and can be controlled and otherwise configured to occur in synch with, for example, vehicle cabin lighting, or can be controlled and configured to occur independently from typical vehicle cabin lighting, for example, in-flight sequences and/or flight sequences that may be regulatorily mandated (take-off, landing, taxiing, etc.).

Presently disclosed aspects include implementing an invisible translucent material layer inserted into selected strategic locations of a vehicle cabin structure (that can be, for example, a structural or support panel within a vehicle cabin structure, such as, for example, a honeycomb panel, etc.). The present systems, apparatuses, and methods comprise a light source, a clear translucent lens material, with the lens embedded within or applied to a vehicle cabin panel of a vehicle cabin structure. According to certain present aspects, a translucent "lens" material and associated light sources work together with the panel build up, including incorporating a stenciled design, to produce a desired and selected visually-detectable effect.

Presently disclosed panel illumination options can include light sources that can be, for example, a LED or OLED component, one or more LED or OLED light sheets, light pads, a plurality of discrete lights, PAR lights in communication with a cord and further in communication with a power source, printed circuits comprising lights, etc.

While present illustrations depict a vehicle cabin sidewall and vehicle cabin sidewall panel comprising present apparatuses, systems, and methods, the present application, according to further present aspects, further contemplates a plurality of vehicle cabin panels and vehicle cabin structures that can be are positioned adjacent to one another including, and not limited to, vehicle cabin storage bins, vehicle cabin partitions; vehicle cabin seat backs, vehicle cabin floors, vehicle cabin ceilings, vehicle cabin monuments (including, for example, galleys, lavatory walls, lavatory doors, etc.), and other vehicle cabin structures, etc.

FIG. 1 is an illustration of a vehicle in the form of an aircraft 10 comprising fuselage 12. FIG. 2 is a cross-sectional view of aircraft 10 taken along line 2-2 and showing an aircraft cabin 14 comprising an aircraft cabin sidewall 20 (referred to equivalently herein as a "sidewall") that further comprises one or more aircraft cabin sidewall panels 21. As further shown in FIG. 2, aircraft cabin 14 further comprises aircraft cabin structures including an aircraft cabin ceiling 22, aircraft cabin floor 24 and aircraft cabin storage bins 26. Each of the aircraft cabin structures set forth herein comprise an exterior surface facing into the aircraft cabin 14.

FIG. 3 is a partial interior view from within aircraft cabin 14 facing toward an outboard section of aircraft 10 and facing aircraft sidewall 20 comprising sidewall panel 21, with sidewall panel 21 further comprising sidewall panel exterior surface 21a. FIG. 4 is a further partial cabin interior view of aircraft cabin 14 of aircraft 10 showing sidewall 20 comprising a plurality of sidewall panels 21, with each sidewall panel comprising sidewall panel exterior surface 21a. FIG. 3 further shows a storage bin assembly 25 comprising a plurality of storage bins 26, with the sidewall 20 (referred to equivalently herein as vehicle cabin sidewall 20) and the storage bin assembly 25 positioned adjacent to partition wall 28 (referred to equivalently herein as vehicle cabin partition wall 28). As shown in FIG. 4, partition wall 28 is positioned substantially perpendicular to sidewall 20, with partition wall 28 further comprising partition wall panel 28a (referred to equivalently herein as vehicle cabin partition wall panel 28a) facing into aircraft cabin 14.

FIG. 5A is an enlarged perspective view of the sidewall 20 of the type shown in FIGS. 2, 3, 4, with sidewall 20 comprising a plurality of sidewall panels 21 (referred to equivalently herein as vehicle cabin sidewall panels 21), with sidewall panels 21 comprising a plurality of cutout sections 31 having a cutout section perimeter 31a with cutout section 31 exposing, according to a present aspect, a translucent material layer 32. FIG. 5B is a further enlarged view of sidewall panel 21 of the type shown in FIGS. 2, 3, 4, 5A, with sidewall panel 21 further showing a plurality of cutout sections 31 having a cutout section perimeter 31a with cutout section 31 exposing, according to a present aspect, a translucent material layer 32.

According to one present example, the construction of the sidewall panel incorporating the present apparatus, systems, and methods can be configured to display an image, a pattern, a design, etc., that will be illuminated when a light source (that is positioned adjacent to one or more locations on the sidewall panel interior (e.g., the "interior" side of the sidewall panel that would not be visible from within the aircraft cabin) is illuminated. According to this example, (shown, for example, in FIGS. 5A, 5B) the sidewall panel exterior surface 21a of vehicle cabin sidewall panel 21 can comprise, for example, a composite material build up such that a sidewall panel composite material layer exterior side (e.g., the side that is exposed to and visible from within the aircraft cabin) sustains a series of cutouts and/or through openings, through the sidewall panel composite material layer, with the cutouts covered by the translucent material layer. In this example, the cutouts are illuminated and visually detected as an image 34 being illuminated when a light source located adjacent to an internal region of the sidewall panel is illuminated. In addition, in this example of a presently disclosed sidewall panel construction, even when a light source is not activated and the interior of the sidewall panel is not illuminated, the shapes of the cutouts could be perceived in the sidewall (for example, visually detectable by an aircraft cabin occupant). That is, according to this example, the sidewall panel is constructed such that the translucent material layer that at least occupies the space of the cutout section is exposed and visible from within the aircraft cabin, and the overall shape of the cutouts can also be visible in the presence or absence of an illuminated light source (although not as visible as when illuminated).

FIGS. 6A and 6B are further enlarged views of the sidewall panel 21 showing the sidewall panel exterior surface 21 of the sidewall 20 of the type shown in FIGS. 2, 3, 4, 5A, and 5B, with sidewall panel 21 with a sidewall panel exterior surface 21a further comprising a plurality of sidewall panel cutout sections 31 having a cutout section perimeter 31a with cutout section 31 exposing, according to a present aspect, a translucent material layer 32. FIG. 6A shows the sidewall panel 21 with a light source activated (in an "LIGHT ON" mode), and with a light source activated (light source itself not shown in FIGS. 6A, 6B) such that the sidewall panel cutout section 31 is illuminated as light passes through the translucent material layer 32 at the sidewall panel cutout section 31. In FIG. 6B, the light source is not activated (is in an "LIGHT OFF" mode) such that the sidewall panel cutout section is not illuminated; but the cutout section and any design or patterns and/or designs created in the sidewall panel by the cutout sections could still be visible, although not illuminated.

FIGS. 7A, and 7B are further views of the sidewall panel 21 as shown in FIGS. 2, 3, 4, 5A, 5B, 6A, 6B with FIG. 7A again showing a "front" or cabin view of the sidewall panel 21 surface that is exposed and otherwise faces into the aircraft cabin. FIG. 7B is a view of the opposite side of the sidewall panel of the type shown in FIG. 7A (e.g., a view of the "interior", of the sidewall panel) this time showing a sidewall panel interior surface 21b of the sidewall panel 21, according to present aspects. As shown in FIG. 7B, a light source 40 is shown, with the light source 40 configured as a light cord 42 comprising a plurality of lights 44 that can be, for example LEDs, OLEDs, etc., and with light cord 42 positioned adjacent to sidewall panel interior surface 21b (referred to equivalently herein as the "side wall second side" 21b) via light source attachments 46 in contact with sidewall panel second side 21b. As shown in FIG. 7B, sidewall panel interior surface 21b side further contacts a light diffuser material section 32, that can, for example be in the form of a translucent material panel, with the light diffuser material section 32 shown in FIG. 7B as covering the sidewall panel cutouts 31 shown in FIG. 7B in "dotted" lines.

The aircraft cabin sidewall panel 21 shown in FIGS. 6A, 6B, 7A, 7B and described herein can provide a light impervious material or a light pervious material that can be a composite material. When the sidewall panel 21 comprises a light impervious material, the cutout sections introduced into the sidewall panel will allow light to pass from a light source (when the light source is activated) through both the cutout section in the sidewall panel and the light diffuser material panel located at the sidewall panel second side (e.g., the sidewall panel interior surface 21b). Accordingly, when the sidewall panel comprises a light impervious material, light from a light source, when activated, will proceed through the cutout section of the sidewall panel's light impervious material, as the rest of the light is "blocked" by the light impervious material.

When the sidewall panel comprises a light pervious material, the cutout sections introduced into the sidewall panel will allow light to pass from a light source (when the light source is activated) through both the cutout section in the sidewall panel and the light diffuser material panel located at the sidewall panel second side (e.g., the sidewall panel interior surface). Accordingly, when the sidewall panel comprises a light pervious material, light from a light source, when activated, will mainly proceed at a higher intensity through the cutout section of the sidewall panel's light pervious material, and an amount of light, at a lower intensity (than the light intensity passing through the cutout) can proceed through the light pervious material and illuminate portions of the non-cutout sections as well, but visually perceived to be at a lower light intensity.

Further present aspects contemplate a sidewall panel construction and a construction for further aircraft cabin structures (and the aircraft cabin interior structure panels) that do not comprise exposed cutout sections visible in a sidewall panel exterior side (e.g., at a panel exterior surface), yet an illuminated design or pattern is created only when a light source is illuminated from behind a sidewall or other structure panel. That is, further present aspects contemplate apparatuses, systems, and methods directed to situations where it may not be desired to view a general illumination of a vehicle cabin interior panel except for a specifically selected design, pattern, indicia, areas, etc., that is to be selectively and or periodically visible only when illuminated.

According to further present aspects, FIGS. 8A, 8B, 8C, and 8D illustrate a vehicle cabin interior panel 50 (e.g., an aircraft cabin interior sidewall panel or other aircraft cabin interior structure panel, etc.) where a selectively illuminated region can appear to glow or otherwise be visibly detectable through the vehicle cabin interior panel when a light source residing behind the panel is activated. In another aspect, the remainder of the panel is not illuminated; only the selected image or images are visibly detected and detectable as appearing in the vehicle cabin interior panel.

In other examples, the selected illuminated image will visually appear illuminated at a higher panel illumination intensity that will be greater than any "glow" of a lower illumination intensity that may illuminate the remainder of the aircraft cabin interior panel to lesser visually detectable degree.

FIG. 8A is a schematic side and cross-sectional side view of a panel construction of a vehicle cabin interior panel, according to present aspects. As shown in FIG. 8A, vehicle cabin interior panel 50 comprises a light pervious substrate material layer 52 that can comprise more than one light pervious composite material types and/or more than one light pervious composite material layers. In other words, each composite material can comprise more than one ply. As shown in FIG. 8A, light pervious substrate material layer 52 comprises a co-curable light pervious first substrate material 52a and a co-curable light pervious second substrate material 52b. The vehicle cabin interior panel 50 further comprises a vehicle cabin interior panel exterior surface 50a that appears as the outermost panel surface, and that would be visible to a cabin passenger situated within a vehicle cabin interior.

As further shown in FIG. 8A, vehicle cabin interior panel 50 further includes a structural core layer 54 that can impart structural stiffness to the vehicle cabin interior panel 50. The structural core layer can be, for example, a cellular core structure such as, for example, a honeycomb structural core material, and the structural core material can be co-curable with the material layers that comprise the light pervious substrate material layer 52.

As further shown in FIG. 8A, the structural core layer 54 is a discontinuous layer, with a selected region of the structural core layer 54 removed (e.g., as a structural core material "plug", etc.) before or after laying up the structural core material onto the light pervious substrate layer 52 to form the discontinuous or "incomplete" layer of structural core material 54. As shown in FIG. 8A, and according to further present aspects, the material removed from the structural core material layer is replaced with a light diffuser material section 56 that is configured to substantially match the dimension of structural core material that is removed, such that the light diffuser material section is "embedded" or otherwise included within and into the structural core material layer 54, and is further embedded within the assembly of the vehicle cabin interior panel 50. The light diffuser material section 56 comprises a co-curable material that can be a co-curable translucent material that can be co-cured with the co-curable structural core material 54 and the co-curable light pervious substrate material layers 52.

In another aspect, the co-curable light diffuser material section 56 can be co-cured to a translucent state (but may not be translucent in a co-curable state). The term "translucent" according to present aspects means that the material is not completely clear or transparent, but that the material is clear enough to allow light to pass through. In a further aspect, the light diffuser material section can be clear enough to be considered to be transparent. The co-curable light diffuser material section can comprise a material such as, for example, polycarbonate, acrylic, etc., and combinations thereof.

As further shown in FIG. 8A, a co-curable light pervious third material layer 52c is added to the co-curable material "stack" and positioned adjacent to the structural core material comprising the translucent light diffuser material section. The co-curable light pervious third material 53c can be the same or different from the co-curable light pervious first material 52a and/or the co-curable light pervious second material 52b. FIG. 8A further shows a co-curable light impervious material layer 58 positioned adjacent to the co-curable light pervious third material 53c. The co-curable light impervious material layer 58 is dimensioned to at least cover the area occupied by the light diffuser material section 56, and is shown in greater detail in FIG. 8B. The co-curable light impervious material layer 58 is made from a "light-blocking" material through which light cannot pass. According to present aspects, by cutting a selected design, indicia, shape, pattern, pattern of shapes, etc. into light impervious material layer 58, light can be allowed to selectively pass through the light impervious material layer 58 at the "through regions" (referred to equivalently herein as through openings) fashioned into and though the thickness of the light impervious material layer 58.

The disclosed assembled co-curable component layers, upon co-curing, are selected to form the co-cured assembly that is the vehicle cabin interior panel 50. In the assembled and co-cured state, as shown in FIG. 8A, the side of the light impervious material layer 58 that is not adjacent the light pervious substrate third material becomes the vehicle cabin interior panel second side 50b that can be located adjacent an internal light source, is positioned as an outboard section of vehicle cabin panel in a vehicle cabin structure, is the side of the panel that would not be visible to an occupant of the vehicle cabin, and that is shown in greater detail at least in FIG. 8B. The material selected for use in each component layer shown in FIG. 8A to form the vehicle cabin interior panel 50 can be a material that is co-curable with each of the material layers that together form the composite material co-curable stack that, once co-cured will become the vehicle cabin panel 50. Any practical co-curing regimen is contemplated based upon the material layers selected. In one example, the co-curable material layers can be co-cured within a temperature ranging from about 240° F. to about 260° F.

FIG. 8B shows the vehicle cabin interior panel 50 of the type and comprising the assembly shown in FIG. 8A, with FIG. 8B showing the vehicle cabin interior panel second side 50b (e.g., the side of the panel that would not be visible to an occupant of the vehicle cabin also referred to herein as the "outboard" side of the panel). As shown in FIG. 8B, vehicle cabin interior panel 50 comprises the light diffuser material section 56 embedded into the vehicle cabin interior panel 50, and covered by the light impervious material layer 58 into which has been fashioned a plurality of cutouts 59 to establish a pattern of cutouts in the light impervious material layer 58. As further shown in FIG. 8B light source 40 is disposed adjacent the vehicle cabin interior panel second side 50b and the light impervious (light-blocking) material layer 58, with the light source 40 comprising light cord 42 with associated lights 44 that can be, for example, LEDs, OLEDs, etc., with light source attachments 46 configured to position the light source in relation to the vehicle cabin interior panel second side 50b with the lights in the light source positioned adjacent the cutout openings in the light impervious material layer 58.

In operation, when the light source is activated and powered from a power source (not shown in FIG. 8B), light emanating from the light source 40 will proceed through the cutouts 59 in the light impervious material layer 58 and through the several light pervious layers of the vehicle cabin interior panel 50 such that the indicia, patterns, patterns of indicia, etc., of the cutouts will be visually detected and visible at the vehicle cabin interior panel first side 50a by, for example, a vehicle cabin occupant.

FIG. 8C represents an image emerging through the vehicle cabin interior panel first side 50a of the panel 50 when the light source is activated (e.g., to a "LIGHT ON" mode) to emit light into and through panel 50. When the light source is configured to a "LIGHT OFF" mode and the light source is turned off, the previously viewable image emanating from the vehicle cabin interior panel 50 will cease to be visible (e.g., will be visually undetectable), as shown in FIG. 8D.

In an alternate present aspect, a vehicle cabin interior panel can be assembled with the multiple component layers assembled together as already described, but with several of the component layers not co-cured to form the resulting vehicle cabin interior panel. FIGS. 9A, 9B, 9C, 9D illustrate a vehicle cabin interior panel comprising components and component layers according to such an alternate aspect. That is, the vehicle cabin interior panel 60 shown in FIGS. 9A, 9B, 9C, 9D presents and otherwise obtains a visually detected image or images similar to the vehicle cabin interior panel 50 shown in FIGS. 8A, 8B, 8C, 8D, with one difference being the assembly of the vehicle cabin interior panel 60 taking place after the co-curing of some, but not all component layers of the vehicle cabin panel.

FIG. 9A is a schematic side and cross-sectional view of a panel construction of a vehicle cabin interior panel, according to present aspects. As shown in FIG. 9A, vehicle cabin interior panel 60 comprises a light pervious substrate material layer 62 that can comprise more than one light pervious composite material. Each composite material can comprise more than one ply. As shown in FIG. 9A, light pervious substrate material layer 62 comprises a co-curable light pervious first substrate material 62a and a co-curable light pervious second substrate material 52b. The vehicle cabin interior panel 60 further comprises a vehicle cabin interior panel exterior surface 60a that appears as the outermost panel surface, and that would be visible to a cabin passenger situated within a vehicle cabin interior.

As further shown in FIG. 9A, vehicle cabin interior panel 60 further includes a co-curable structural core layer 64 that can impart structural stiffness to the vehicle cabin interior panel 60. The structural core layer can be, for example, a cellular core structure such as, for example, a honeycomb structural core material, and the structural core material can be co-curable with the material layers that comprise the light pervious substrate material layer 62 (e.g., light pervious first substrate material 62a, light pervious second substrate material 62b), for example at a temperature ranging from about 240° F. to about 260° F.

As further shown in FIG. 9A, the structural core layer 64 is a discontinuous layer, with a selected region of the structural core layer 64 removed (e.g., as a structural core material "plug", etc.) before or after laying up the structural core material onto the light pervious substrate layer 62 to form the discontinuous or "incomplete" layer of structural core material 64.

As shown in FIG. 9A, and according to further present aspects, the material removed from the structural core material layer is replaced in a finished panel 60 with a light diffuser material section 68 that is configured to substantially match the dimension of structural core material that is removed such that the light diffuser material section 66 is embedded into the structural core material layer, and is further embedded within the assembly of the vehicle cabin interior panel 60. However, in this alternative aspect, the light diffuser material section 66 is not co-curable with the light pervious substrate layer 62 and/or the structural core layer 64. Instead, the light diffuser material section is inserted "post-cure" into the cured structural core layer 64.

As further shown in FIG. 9A, a light pervious third material layer 62c is positioned adjacent to the structural core material 64 comprising the translucent light diffuser material section. The light pervious third material 62c can be the same or different from the co-curable light pervious first substrate material 62a and/or the light pervious second substrate material 62b.

FIG. 9A further shows a light impervious material layer 68 positioned adjacent to the co-curable light pervious third material 62c. The light impervious material layer 68 is dimensioned to at least cover the area occupied by the light diffuser material section 66, and is shown in greater detail in FIG. 9B. The light impervious material layer 68 is made from a "light-blocking" material through which light cannot pass. According to present aspects, by cutting a selected design, indicia, shape, pattern, pattern of shapes, etc. into and through the thickness of the light impervious material layer 68, light can be allowed to selectively pass through the light impervious material layer 68 at the "through opening regions" fashioned into and though the thickness of the light impervious material layer 68.

According to one example, after the co-curing of the light pervious substrate material layer 62 with the structural core layer 64, the remainder of the panel assembly that includes the light diffuser material section 66, the light pervious substrate third material layer 62c, and the light impervious material layer 68 can be co-cured separately and then assembled with and into the separately co-cured light pervious first and second substrate material layers 62a, 62b and the co-cured structural core material 64. These material layers that are, in this example, not co-curable with the light pervious substrate material layer 62 and the structural core layer 64 are shown in FIG. 9A within the dotted line region 67.

The disclosed assembled component layers shown in FIG. 9A collectively form the assembly that can be a vehicle cabin structure that can be, for example, the vehicle cabin interior panel 60. In the assembled state, as shown in FIG. 9A, the side of the light impervious material layer that is not adjacent the light pervious substrate third material can become the vehicle cabin interior panel second side 60b that can be located adjacent an internal light source, and that is positioned as an "outboard-most" section of vehicle cabin panel 60 in a vehicle cabin structure, and is the side of the panel that would not be visible to an occupant of the vehicle cabin, (and that is shown in greater detail at least in FIG. 9B).

FIG. 9B shows the vehicle cabin interior panel 60 of the type and comprising the panel assembly as shown in FIG. 9A, with FIG. 9B showing the vehicle cabin interior panel second side 60b (e.g., the side of the panel that would not be visible to an occupant of the vehicle cabin also referred to herein as the "outboard-most" side of the panel). As shown in FIG. 9B, vehicle cabin interior panel 60 further comprises the light diffuser material section 66 embedded into and within the vehicle cabin interior panel 60, and is otherwise substantially covered by the light impervious material layer 68 into which has been fashioned a plurality of cutouts 70 (in the form of seagulls) to establish a pattern of cutouts (the pattern shown as flock of seagulls) in the light impervious material layer 68.

As further shown in FIG. 9B light source 40 is disposed adjacent the vehicle cabin interior panel second side 60b and the light impervious (light-blocking) material layer 68, with the light source comprising light cord 42 with associated lights that can be, for example, LEDs, OLEDs, etc., with light source attachments 46 configured to position the light source in relation to the vehicle cabin interior panel second side 60b, and with the lights in the light source positioned adjacent the cutouts 70 (referred to equivalently herein as "cutout openings") in the light impervious material layer 68 (referred to equivalently herein as the "blocking layer" and/or "doubler layer").

In operation, when the light source is activated and powered from a power source (not shown in FIG. 9B), light emanating from the light source 40 will proceed through the cutouts 70 in the light impervious material layer 68. Light will continue to proceed through the several light pervious layers of the vehicle cabin interior panel 60 such that the pattern of the cutouts will be visually detectable, visually detected, and otherwise visible at the vehicle cabin interior panel first side 60a by, for example, a vehicle cabin occupant.

FIG. 9C shows a vehicle cabin panel first surface 60a (e.g., the exposed panel surface facing into the vehicle cabin) of vehicle cabin interior panel 60. In operation, as shown in FIG. 9C, in an illuminated state with the lights from behind panel 60 illuminated, image 72 becomes visible (e.g., visually detectable to an occupant of the vehicle cabin at a section of the vehicle cabin interior panel.

FIG. 9C represents the illuminated state of vehicle cabin interior panel 60, with illuminated image 72 emerging through the vehicle cabin interior panel first side 60a of the panel 60 when the light source from behind the panel is activated (e.g., to a "LIGHT ON" mode) to emit light into and through panel 60. When the light source is configured to a "LIGHT OFF" mode and the light source is turned off, the previously viewable image 72 emanating from the vehicle cabin interior panel 60 will cease to be visible (e.g., will be visually undetectable). FIG. 9D is a further illustration of a view of the vehicle cabin interior panel second side 60b (interior side) of panel 60 of the type shown at least in FIG. 9C.

In addition, according to further present aspects, the vehicle cabin interior panel first sides 50a, 60a of the respective vehicle interior panels 50, 60 is not "cut through". The light diffuser material section 56, 66 is completely embedded within the panel assembly, and an integrated "stencil layer" is included in the panel material "stack" closest to the light source, and in the form of a light impervious material layer 58, 68 that comprises the cutouts, patterns of cutouts, etc. that form the indicia, patterns of indicia, etc.).

The outer surfaces of such vehicle cabin structures comprising the disclosed panels and panel assemblies will not reveal any visually detectable change in the exterior surface of such panel exterior surfaces 50a, 60a until a light source is activated. Once the light source that is located behind these panel types is activated, and a light source is illuminated, the shapes and patterns of the cutouts made in the light impervious material within the panel assembly will allow light to pass through and result in the appearance of selected images, selected patterns of images, etc. That is, in an illuminated state, and only in an illuminated state when a light source is activated, will panels according to these aspects (e.g., panels 50, 60, etc., as shown at least in FIGS. 8A and 9A) reveal a "glowing" image through the panel that can be visually detected. When the light source is not activated and the panels are not illuminated from behind the panels, no lighted image (and no evidence of any image or pattern of images) will be visually detectable and/or visually detected, such as by a vehicle cabin occupant.

According to present aspects, the presently disclosed panels produce the ability and can otherwise be configured to selectively produce a selected visually detectable illuminated image, pattern of images, etc. in a vehicle cabin structure panel, and can further produce such selected visually detectable images for a selected time period (e.g., duration), or can further produce such selected visually detectable images in a selected sequence over a selected time period.

In addition, the presently disclosed panels can produce an illuminated image, patterns of images, sequences of images, etc., of selected color, selected changing colors, selected plurality of colors, selected plurality of changing colors (such as by, for example, activating and controlling/sequencing programmable LED PAR lights, etc.). Accordingly, through the use of automated and/or programmable control sequences placed into communication with the present panels, the selected illumination patterns and illumination sequences (e.g., produced within and emanating through the present panels) can create and alter general vehicle cabin ambiance and, when light sources are individually sequenced (e.g., programmable and sequenced light sources than can, for example, be controlled by a controller that can be in communication with a programmed computer, etc. into a selected "ON" and "OFF" position for selected durations, etc.), can also present entire scenes that are visually detectable across and through a plurality of vehicle cabin structures, and across and through adjacently positioned vehicle cabin structure panels, including, for example, selected scenes and other selected visual effects can appear to "move" along, among, or within one or more panel surfaces located within a vehicle cabin.

A non-limiting example of visually detectable movement that can be produced by the presently disclosed vehicle cabin panels and vehicle cabin structures comprising the panels can include those effects shown in FIGS. 10A, 10B, 10C, 10D. FIG. 10A shows a vehicle cabin structure in the form of a vehicle cabin partition wall 28 comprising a vehicle cabin partition wall panel 28a. Vehicle partition wall panel 28a (referred to equivalently herein as partition wall panel 28a) can be constructed to comprise the vehicle cabin panel assemblies disclosed herein, and that can be similar in construction to the vehicle cabin sidewall panels of the type described herein.

As shown in FIGS. 10A, 10B, 10C, 10D vehicle cabin partition wall 28 can be positioned adjacent to (e.g., and positioned, for example, perpendicular to) a vehicle cabin sidewall 21 that comprises a plurality of vehicle cabin sidewall panels 61a, 61b, 61c. Vehicle cabin sidewall panels 61a, 61b, 61c can each further comprise the vehicle cabin interior panel 21, 50, 60 of the type described herein, with the vehicle cabin interior panel 60 as shown comprising a vehicle cabin panel first side (exterior surface) 61a. That is, while FIGS. 10A, 10B, 10C, 10D are labelled to show vehicle cabin panels 60 as described herein, it is to be understood that the similar visually detected images and effects would be detectable to an aircraft passenger cabin occupant if the panels 50 described herein as well as the panels 21 described herein were in use (with the proviso that the vehicle cabin sidewall panel 21 differs from panels 50, 60 in that the outer surface of the panel 21 is disturbed by cutting through the exterior panel surface and making the cutout sections from panel exterior of panel 21 somewhat visible even when the light source is not illuminated). In addition, as shown in FIG. 10A, vehicle cabin partition wall 28 comprises a vehicle cabin partition wall panel 28a that can be structurally equivalent to and can otherwise comprise the construction and assemblies of the vehicle cabin sidewall interior panels 21, 50, 60 disclosed herein.

In operation, according to present aspects, when a light source that is in communication with, and is otherwise positioned adjacent to, the vehicle cabin partition wall panel and is located "behind" the vehicle cabin partition wall panel 28a of vehicle cabin partition wall 28 is activated (e.g., powered from a power source in communication with the light source and not shown in FIG. 10A and illuminated), an image 74 that is visually detectable now appears at and within the vehicle cabin partition wall panel 28a (e.g., shown in FIG. 10A as a lighthouse image or nautical scene). Image 74 can be an overall image comprising a pattern of, or collection of the same or different images to present an overall visual representation of a larger object, or a complex scene 75, etc., or a pattern of images, etc., that is created by providing a plurality of individual cutouts or through-openings 59, 70 in the light impervious ("light-blocking") material layer 58, 68 embedded within the panel assembly constructions 50, 60, respectively, as shown at least in FIGS. 8B and 9B (or, according to an example, the vehicle cabin sidewall cutouts 31 made to vehicle cabin sidewall interior panel 21, etc., as shown at least in FIG. 5B).

According to some present aspects, for panels 50, 60, when the light source is deactivated or powered down to an "OFF" position, etc., the images 72, 74 becomes visually undetectable and otherwise "disappear" from the sidewall panels 60, and/or partition wall 28. Although not shown in FIG. 10A, when a plurality of light sources that can be individually controlled are used, in operation, signals in the light sources, for example one or more LED PAR lights, or signals sent from a controller in communication with the light source can generate selected colors or colored patterns that can create a multi-colored image lighting effect that is visually detectable. In addition, if the plurality of light sources are sequenced via, for example, a sequencing circuit that comprises a controller or sequencer, etc., various of the plurality light sources can be turned on and off at selected locations within the image area for selected ON/OFF time durations to create a changing, visually detectable image in the panel that can, for example, change the image or "scene", or that can create a selected effect (a twinkle, or the appearance of movement in the scene—e.g., a nautical scene with seagulls in flight, forest scene, leaves blowing from or into pile, etc.).

When a vehicle cabin has adjacently positioned vehicle cabin structures that each comprise the presently disclosed vehicle cabin panels, light sources behind, associated with, and otherwise in communication with the vehicle cabin panels of the adjacently positioned vehicle cabin structures can be coordinated to periodically activate and deactivate between "ON/OFF" positions via, for example, a controller, sequencer, or other device that can itself comprise a programmable and/or programmed device or that can be in communication with the light sources, etc., to expand the visually detectable image "scene" from beyond the boundary of one panel or one cabin structure into another adjacent structure by producing images that appear and disappear, and that can create a myriad of visually detectable images, scenes, and effects including, for example, the appearance of image movement, with or without color changes, etc.

For example, as shown in FIG. 10B, a vehicle cabin partition wall 28 of the type shown in FIG. 10A is positioned within the vehicle cabin adjacent to and substantially perpendicular to a vehicle cabin sidewall comprising a vehicle cabin sidewall panels 60 each comprising a vehicle cabin sidewall panel exterior surface 60a. When lights behind and associated with or otherwise in communication with the vehicle cabin wall panels are activated to an "ON" position and powered up from a power source the illumination of the light sources through the panels creates a visually detectable image 74 at and within sections of the partition panel 28a. As shown in FIG. 10B the scene presented in FIG. 10A is now extending from the partition wall 28 and into the sidewall panel 61a immediately adjacent to the vehicle cabin partition wall 28.

As shown in FIG. 10C, the visually detected image(s) in the form of a nautical "scene" 75 occupying and otherwise emanating from the partition wall and the sidewall panels immediately adjacent to the partition wall now has changed and "travelled" to the next sidewall panel 61b, as images 72 are visually detected at the next sidewall panel 61b as light sources activate to cause the illumination of image 72 in two sidewall panels 61a, 61b. Note that the images 72 that were present in sidewall third panel 61c in FIG. 10B, are now absent in FIG. 10C, as the illumination required to show such images 72 in panel 61c is shut or cycled or sequenced "OFF".

As selected light sources are cycled through an activation circuit or programmable pattern (e.g. with the programmable pattern including light intensity, duration, moving between individual light source "ON/OFF" cycles, etc.), the visually detectable images change appearance, appear, disappear in a selected sequence that can render an appearance of movement of gulls in flight. This effect is further shown in FIG. 10D where varied images 72 resulting from the cutout sections in the light impervious "light-blocking" layer embedded within the sidewall panels allow the selected passage of light in selected shapes, and the light diffusing material section embedded within the panel assembly diffuses the light through the light pervious layers of the panel assembly.

FIGS. 10A, 10B, 10C, 10D have been described according to present aspects that produce panels where the light diffuser material section is completely embedded within the panel assembly, and where the panel assembly comprises a light impervious material layer with cutouts therethrough. In addition, the present aspects that describe a panel assembly where at least a portion of the light diffuser material section is not completely embedded within the panel, and, instead, the exterior surface of the panel comprises cutouts (visibly exposing at least a portion of the light diffuser material section) can also produce the stated effects of motion through sequenced illumination shown in FIGS. 10A, 10B, 10C, 10D. It is understood that, as described herein, the cutouts and patterns of cutouts in the panels made according to these present aspects would produce a visually detectable "lighthouse and gulls" (and, for example, though not shown, waves, etc.) that would remain somewhat visually detectable (e.g., in the types of panels shown producing images 34 shown in FIGS. 5A, 5B, 6A, 7A) even when the light source is not activated and the panel is not illuminated by a light source, as explained herein.

FIGS. 11, 12 illustrate design that can be logos 76, 78 that can be illuminated to appear within a vehicle cabin panel of the type disclosed herein that can be, for example a vehicle cabin interior sidewall panel 30, 50, respectively, and that could also be a selected vehicle cabin panel associated with a vehicle cabin structure, etc. Such logos may or may not have associated lighting programmed to give the appearance of movement in the design as lighting changes. However, associated light sources can be configured to produce color changes such that the logo can appear in different and, if desired selected and varying associated colors, that can appear to change color, for example, via, for example, a LED PAR color light-changing progression, etc. According to certain present aspects, as shown in FIG. 11, indicia, such as logos, designs, etc. though not lighted, may be visually detectable at the panel surface 30 (e.g., when natural or augmented cabin lighting is present, etc.). In other present aspects, as shown in FIG. 12, when the panel exterior surface 50*a* is "unaltered" such that there are no through-openings or cutouts in the exterior panel surface, an image 78 in such panel 50 will only be visible when the panel is associated with an interior light source that is illuminated.

FIG. 13 describes an exemplary present system 90 showing the various system components in schematic representation. As shown in FIG. 13, a vehicle cabin in the form of an aircraft cabin 14 of an aircraft 10 comprises a vehicle cabin structure 91 that can further comprise a vehicle cabin panel 92 in communication with a light source 94 that can be positioned adjacent to an internal or interior surface of the vehicle cabin panel. Power source 96 is in communication with light source 94 and can further be in communication with a controller 98 that can comprise a programmable sequencer to interrupt power to the light source, or that can otherwise send signals to a light source to create selected visually detectable effects including, for example, changing color, changing light intensity (dimming, etc.), sequencing a plurality of powered lights individually to various "ON/OFF" cycles to achieve the illusion of movement of an illuminated form or "scene", etc.

FIGS. 14, 15 are flowcharts outlining methods associated with the presently disclosed apparatuses and system. As illustrated in FIG. 14, present aspects contemplate a method 100 for producing a selected illuminated image within adjacent vehicle cabin structures that can be a plurality of adjacent vehicle structures in a passenger vehicle cabin, with the method 100 including providing 102 a first vehicle cabin structure (e.g., a sidewall) adjacent to a second vehicle cabin structure (e.g., another sidewall or another adjacent cabin structure such as, for example, a partition wall, etc.), with the first vehicle cabin structure including a first vehicle cabin panel, with the second vehicle cabin structure comprising a second vehicle cabin panel, with the first vehicle cabin panel and the second vehicle cabin panel each including a vehicle cabin panel first region (light-blocked region) and a vehicle cabin panel second region (light transmissive region). The method 100 further includes activating 104 at least one light source, said light source positioned adjacent a vehicle cabin panel second side (interior), blocking 106 a selected amount of light from passing through the vehicle cabin panel first region (the "blocked" region), transmitting 108 a selected amount of light from the light source to at least one vehicle cabin panel second side, emitting 110 a selected amount of light from at least one of the first and second vehicle cabin panels into a vehicle cabin through at least one vehicle cabin panel at a vehicle cabin panel second section, and controlling (including, e.g., sequencing, etc.) 112 via a controller, etc., light emitted from at least one of the first vehicle cabin panel and the second vehicle cabin panel to form an illuminated image in at least one of the first vehicle cabin panel and the second vehicle cabin panel, with the illuminated image configured to extend beyond a first vehicle cabin structure boundary to at least one adjacently positioned vehicle cabin panel.

According to further aspects, FIG. 15 outlines a further method 200 incorporating apparatuses and systems disclosed herein, with method 200 including providing 102 a first vehicle cabin structure (sidewall) adjacent to a second vehicle cabin structure (another sidewall or another adjacent cabin structure), with the first vehicle cabin structure including a first vehicle cabin panel, with the second vehicle cabin structure comprising a second vehicle cabin panel, with the first vehicle cabin panel and the second vehicle cabin panel each including a vehicle cabin panel first region (light-blocked region) and a vehicle cabin panel second region (light transmissive region). Each of the first and second vehicle cabin panels can include a composite material substrate, with the composite material substrate including a composite material substrate first side (exterior side) and a composite material substrate second side (interior side), with the composite material substrate further including a light pervious first substrate material layer that includes at least one light pervious first substrate material (exterior substrate), with the light pervious first substrate material layer including a light pervious first substrate material layer thickness. The composite material substrate further includes a structural core layer including a structural core layer first side (exterior) and a structural core layer second side (interior), with the structural core layer first side (exterior) positioned adjacent to the light pervious first substrate material layer second side (interior), and with the structural core layer including a structural core layer thickness, with the structural core layer further including at least one structural core layer cutout section having at least one structural core layer cutout section area. The composite material substrate further includes a light diffuser material section, with the light diffuser material section including a light diffuser material section first side (exterior) and a light diffuser material section second side (interior), with the light diffuser material section further including a light diffuser material section thickness, with the light diffuse material section dimensioned and configured to substantially and match and occupy the at least one structural core layer cutout section area. The composite material substrate further includes a light impervious substrate material layer (e.g., a "doubler/stencil material" having, for example, one or more image(s) cutout from the light impervious substrate material layer in the form of, for example, a nautical scene), with the light impervious substrate material layer comprising a light impervious substrate material layer thickness, and with the light impervious substrate material layer including at least one light impervious substrate material layer cutout extending through the light impervious substrate material layer thickness. The method 200 further includes activating 104 at least one light source, with the light source positioned adjacent the vehicle cabin panel second side, blocking 106 a selected amount of light from passing through the vehicle cabin panel first region (the "blocked" region), transmitting 108 a selected amount of light from the light source to at least one vehicle cabin panel second side, emitting 110 a selected amount of light from at least one vehicle cabin panel into a vehicle cabin through at least one vehicle cabin panel second region, with the vehicle cabin panel second region configured to appear as an illuminated image, and controlling (e.g., sequencing, etc.) 112, via e.g., a controller, light emitted from at least one of the first vehicle cabin panel and the second vehicle cabin panel to form an illuminated image, plurality of images, and/or scene, with the illuminated image, plurality of images, and/or scene configured to extend beyond a first vehicle cabin structure boundary to at least one adjacently positioned vehicle cabin structure panel. Method 200 further includes installing 202 the first vehicle cabin interior panel in the first vehicle cabin structure, and installing 204 the second vehicle cabin interior panel in the second vehicle cabin structure.

The present aspects may, of course, be carried out in other ways than those specifically set forth herein without departing from essential characteristics of the disclosure. The present aspects are to be considered in all respects as illustrative and not restrictive, and all changes coming within the meaning and equivalency range of the appended claims are intended to be embraced therein.

What is claimed is:

1. A vehicle cabin interior panel comprising:
a composite material substrate, said composite material substrate comprising a composite material substrate first side and a composite material substrate second side, said composite material substrate further comprising a structural core layer comprising a structural core layer first side and a structural core layer second side, and a structural core thickness, said composite material substrate further comprising:
a first substrate material layer comprising a first substrate material first side, said first substrate material layer further comprising a first substrate material layer second side, said first substrate material layer comprising a first substrate material layer thickness, and wherein said first substrate material layer is a light pervious material layer;
a light diffuser material section, said light diffuser material section comprising a light diffuser material section first side and a light diffuser material section second side, said light diffuser material section first side positioned adjacent the first substrate material layer second side, said light diffuser material section further comprising a light diffuser material section thickness;
wherein said light diffuser material section thickness is substantially equivalent to said structural core layer thickness; and
wherein said structural core layer first side is positioned adjacent to the first substrate material layer second side, said structural core layer comprising a structural core layer thickness, said structural core layer further comprising at least one structural core layer cutout section, said at least one structural core layer cutout section extending through the structural core layer thickness, said structural core layer cutout section comprising an area.

2. The vehicle cabin interior panel of claim 1, wherein said first substrate material layer is made from a light impervious material, said first substrate material layer further comprising at least one first substrate material throughopening extending through the first substrate material layer thickness.

3. The vehicle cabin interior panel of claim 1 further comprising a light source, said light source configured to direct light from the light source to the light diffuser material section second side, said light source in direct communication with the light diffuser material section, said light source positioned at a distance from the light diffuser material section second side ranging from about 0 to about 1.0 inch.

4. The vehicle cabin interior panel of claim 1, wherein said light diffuser material section is configured to substantially match said structural core layer section cutout section cutout dimension.

5. The vehicle cabin interior panel of claim 1, wherein said light diffuser material section comprises a light transmissive material.

6. The vehicle cabin interior panel of claim 1, wherein said light diffuser material section comprises at least one of a polycarbonate material, an acrylic material, and combinations thereof.

7. The vehicle cabin interior panel of claim 1, further comprising:
a light pervious second substrate material layer comprising at least one light pervious second substrate material layer, said at least one light pervious second substrate material layer positioned adjacent the structural core layer second side and the light diffuser material section second side; and
a light impervious substrate material layer, said light impervious substrate material layer comprising a light impervious substrate material layer thickness, said light impervious substrate material layer comprising at least one cutout section extending through the light impervious substrate material layer thickness;
wherein the light pervious first substrate material, the structural core layer, the light diffuser material section, the light pervious second substrate material layer and the light impervious substrate material layer in combination form the vehicle cabin interior panel.

8. The vehicle cabin interior panel of claim 7, wherein the light impervious substrate material layer is positioned adjacent the light pervious second substrate material layer second side and at least a section of said light diffuser material section second side.

9. The vehicle cabin interior panel of claim 7, wherein the light pervious first substrate material, the structural core layer, the light diffuser material section, the light pervious second substrate material layer and the light impervious substrate material layer are co-curable.

10. The vehicle cabin interior panel of claim 7, wherein the light pervious first substrate material, the structural core layer, the light diffuser material section, the light pervious second substrate material layer and the light impervious substrate material layer are co-curable within a temperature ranging from about 240° F. to about 260° F.

11. The vehicle cabin interior panel of claim 7, wherein the light pervious first substrate material and the structural core layer are co-curable within a temperature ranging from about 240° F. to about 260° F.

12. The system for selectively illuminating at least one of a plurality of vehicle cabin interior panels in a vehicle cabin interior, the system comprising:
a vehicle cabin interior panel comprising:
a composite material substrate, said composite material substrate comprising a composite material substrate first side and a composite material substrate second side, said composite material substrate further comprising:
a light diffuser material section, said light diffuser material section comprising a light diffuser material section first side and a light diffuser material section second side, said light diffuser material section further comprising a light diffuser material section thickness,
a light source configured to direct light from the light source to light diffuser material section second side, said light source further in communication with a power source; and
a controller in communication with at least one of the light source and said controller;

wherein the composite material substrate further comprises:
a light pervious first substrate material layer comprising at least one light pervious first substrate material layer, said light pervious first substrate material layer comprising a light pervious first substrate material layer first side and a light pervious first substrate material layer second side, said light pervious first substrate material layer comprising a light pervious first substrate material layer thickness;
a structural core layer comprising a structural core layer first side and a structural core layer second side, said structural core layer first side positioned adjacent to the light pervious first substrate material layer second side, said structural core layer comprising a structural core layer thickness, said structural core layer further comprising at least one structural core layer cutout section, said at least one structural core layer cutout section comprising a structural core layer cutout first area;
a light pervious second substrate material layer, said light pervious second substrate material layer positioned adjacent the structural core layer second side and the light diffuser material section second side; and
a light impervious substrate material layer, said light impervious substrate material layer comprising a light impervious substrate material layer thickness, said light impervious substrate material layer further comprising at least one cutout section extending through the light impervious substrate material layer thickness;
wherein the light pervious first substrate material layer, the structural core layer, the light diffuser material section, the light pervious second substrate material layer, and the light impervious substrate material layer in combination form a vehicle cabin interior panel.

13. The system of claim 12, said system further comprising a programmable sequencer in communication with at least one of the controller and the light source.

14. The system of claim 12, wherein in operation, said light source is configured to effect a selected color change sequence.

15. The system of claim 12, wherein the light diffuser material section comprises a translucent material, said translucent material comprising a plurality of differently colored sections.

16. The system of claim 12, wherein said light diffuser material section comprises a translucent material comprising at least one of a polycarbonate material, an acrylic material, and combinations thereof.

17. The system of claim 12, wherein the light source comprises a LED PAR lighting component.

18. The system of claim 12, wherein in operation said system is configured to form a visually detectable selected illuminated image over an area comprising at least two adjacently positioned vehicle cabin structures.

19. The system of claim 18, wherein said at least two adjacently positioned vehicle cabin structures comprise at least one of an aircraft cabin sidewall, an aircraft cabin storage bin, an aircraft cabin closet, an aircraft cabin ceiling, an aircraft lavatory door, an aircraft cabin floor.

20. A vehicle comprising the system of claim 12.

21. An aircraft comprising the system of claim 12.

22. A method for producing a selected illuminated image within a plurality of adjacent vehicle cabin structures in a passenger vehicle cabin, the method comprising:
providing a first vehicle cabin structure adjacent to a second vehicle cabin structure, said first vehicle cabin structure comprising a first vehicle cabin panel, said second vehicle cabin structure comprising a second vehicle cabin panel, said first vehicle cabin panel and said second vehicle cabin panel each comprising a vehicle cabin panel first side and a vehicle cabin panel second side, each of said first vehicle cabin panel and second vehicle cabin panels each further comprising a vehicle panel first region and a vehicle panel second region;
activating at least one light source, said light source positioned adjacent the vehicle cabin panel second side;
blocking a selected amount of light from passing through the vehicle cabin panel first region;
transmitting a selected amount of light from the light source to at least one vehicle cabin panel second side;
emitting a selected amount of light from at least one vehicle cabin panel into a vehicle cabin through at least one vehicle cabin panel second region, said vehicle cabin panel second region configured to appear as an illuminated image; and
controlling via a controller light emitted from at least one of the first vehicle cabin panel and the second vehicle cabin panel to form an illuminated image, said illuminated image configured to extend from a first vehicle cabin structure boundary to at least one adjacently second positioned vehicle cabin panel.

23. The method of claim 22, wherein the illuminated image is configured to impart a visually detected stationary pattern.

24. The method of claim 22, wherein the illuminated image is configured to impart visually detected motion in the illuminated image.

25. The method of claim 22, wherein the illuminated scene is configured to impart a plurality of visually detected colors in the illuminated image.

26. The method of claim 22, wherein the plurality of adjacently positioned vehicle cabin structures each comprise at least one of an aircraft cabin sidewall, an aircraft cabin storage bin, an aircraft cabin closet, an aircraft cabin ceiling, an aircraft cabin floor, an aircraft lavatory door, and combinations thereof.

27. The method of claim 22, further comprising:
installing the first vehicle cabin interior panel in the first vehicle cabin structure;
installing the second vehicle cabin interior panel in the second vehicle cabin structure, the first vehicle cabin interior panel and the second vehicle cabin interior panel each comprising:
a composite material substrate, said composite material substrate comprising a composite material substrate first side and a composite material substrate second side, said composite material substrate further comprising:
a light pervious first substrate material layer comprising at least one light pervious first substrate material layer, said light pervious first substrate material layer comprising a light pervious first substrate material layer first side and a light pervious first substrate material layer second side, said light pervious first substrate material layer comprising a light pervious first substrate material layer thickness; and a structural core layer comprising a structural core layer first side and a structural core layer second side, said structural core layer first side positioned adjacent to the light pervious first substrate material layer second side, said structural core layer comprising a structural core layer thickness, structural core layer further comprising at least one structural core layer cutout section, said at least one structural core layer cutout section comprising a first area;

a light diffuser material section, said light diffuser material section comprising a light diffuser material section first side and a light diffuser material section second side, said light diffuser material section further comprising a light diffuser material section thickness;

a light pervious second substrate material layer comprising at least one light pervious second substrate material ply, said light pervious second substrate material layer positioned adjacent the structural core layer second side and the light diffuser material section second side; and a light impervious substrate material layer, said light impervious substrate material layer comprising a light impervious substrate material layer thickness, said light impervious substrate material layer comprising at least one through-opening through the light impervious substrate material layer thickness.

28. The method of claim 27, wherein the light pervious first substrate material, the structural core layer, the light diffuser material section, the light pervious second substrate material layer and the light impervious substrate material layer in combination are co-cured.

29. The method of claim 27, wherein the plurality of adjacently positioned vehicle cabin structures each comprise at least one an aircraft cabin sidewall, an aircraft cabin storage bin, an aircraft cabin closet, an aircraft cabin ceiling, an aircraft cabin floor, an aircraft lavatory door, and combinations thereof.

* * * * *